US011618566B1

(12) United States Patent
Sikora et al.

(10) Patent No.: US 11,618,566 B1
(45) Date of Patent: Apr. 4, 2023

(54) STATE INFORMATION AND TELEMETRY FOR SUSPENDED LOAD CONTROL EQUIPMENT APPARATUS, SYSTEM, AND METHOD

(71) Applicant: VITA INCLINATA TECHNOLOGIES, INC., Denver, CO (US)

(72) Inventors: Derek Sikora, Denver, CO (US); Sami Dean, Aurora, CO (US); Logan Goodrich, Boulder, CO (US)

(73) Assignee: Vita Inclinata Technologies, Inc., Broomfield, CO (US)

( * ) Notice: Subject to any disclaimer, the term of this patent is extended or adjusted under 35 U.S.C. 154(b) by 446 days.

(21) Appl. No.: 16/847,448

(22) Filed: Apr. 13, 2020

Related U.S. Application Data

(60) Provisional application No. 62/833,394, filed on Apr. 12, 2019.

(51) Int. Cl.
*B64D 1/22* (2006.01)
*G06K 9/62* (2022.01)

(52) U.S. Cl.
CPC ............... *B64D 1/22* (2013.01); *G06K 9/623* (2013.01); *G06K 9/6288* (2013.01)

(58) Field of Classification Search
None
See application file for complete search history.

(56) References Cited

U.S. PATENT DOCUMENTS

| | | |
|---|---|---|
| 1,935,283 A | 11/1933 | Adams |
| 2,651,533 A | 9/1953 | Miller |
| 2,717,656 A | 9/1955 | Bannister |
| 3,036,797 A | 5/1962 | Agusta |
| 3,044,818 A | 7/1962 | Tobey |
| 3,265,336 A | 8/1966 | Peterson |
| 3,554,468 A | 1/1971 | McVicar |
| 3,598,440 A | 8/1971 | Ramsden et al. |
| 3,601,342 A | 8/1971 | Piasecki |
| 3,602,544 A | 8/1971 | Marsh |
| 3,656,796 A | 4/1972 | Cook |
| 3,690,602 A | 9/1972 | Marsh |
| 3,829,052 A | 8/1974 | Flannelly |

(Continued)

FOREIGN PATENT DOCUMENTS

| | | |
|---|---|---|
| GB | 2513646 A | 11/2014 |
| JP | H04256686 A | 9/1992 |

(Continued)

OTHER PUBLICATIONS

International Search Report dated Apr. 3, 2019, for PCT/US19/13603, filed Jan. 15, 2019.

(Continued)

*Primary Examiner* — Anand P Bhatnagar
(74) *Attorney, Agent, or Firm* — Martin Spencer Garthwaite

(57) ABSTRACT

Disclosed are systems, apparatuses, and methods to determine, communicate, and/or respond to state information of at least one of a suspended load control apparatus, carrier, or load suspended by a cable from the carrier, wherein response to the state information may be to control at least one of the suspended load control apparatus, carrier, or load suspended by a cable from the carrier.

20 Claims, 11 Drawing Sheets

(56) References Cited

U.S. PATENT DOCUMENTS

| | | |
|---|---|---|
| 3,838,836 A | 10/1974 | Asseo et al. |
| 3,904,156 A | 9/1975 | Smith |
| 3,946,971 A | 3/1976 | Chadwick |
| 4,124,181 A | 11/1978 | Kolwey |
| 4,138,078 A | 2/1979 | Hester et al. |
| 4,267,987 A | 5/1981 | McDonnell |
| 4,364,704 A | 12/1982 | Dreesen et al. |
| 4,378,919 A | 4/1983 | Smith |
| 4,553,719 A | 11/1985 | Ott |
| 4,601,444 A | 7/1986 | Lindenbaum |
| 4,695,012 A | 9/1987 | Lindenbaum |
| 4,747,745 A | 5/1988 | Pippen et al. |
| 4,826,109 A | 5/1989 | Camus |
| 4,881,601 A | 11/1989 | Smith |
| 4,883,184 A | 11/1989 | Albus |
| 4,889,297 A | 12/1989 | Ikeda |
| 4,984,757 A | 1/1991 | Hartung et al. |
| 5,143,326 A | 9/1992 | Parks |
| 5,190,250 A | 3/1993 | DeLong et al. |
| 5,249,652 A | 10/1993 | Leitzman et al. |
| 5,273,333 A | 12/1993 | Hatfield et al. |
| 5,344,203 A | 9/1994 | Tollenaere |
| 5,352,056 A | 10/1994 | Chandler |
| 5,443,566 A | 8/1995 | Rushmer et al. |
| 5,465,925 A | 11/1995 | Connolly et al. |
| 5,499,785 A | 3/1996 | Roberts et al. |
| 5,518,205 A | 5/1996 | Wurst et al. |
| 5,562,394 A | 10/1996 | Brown, Jr. |
| 5,593,113 A | 1/1997 | Cox |
| 5,613,722 A | 3/1997 | Fandrich et al. |
| 5,898,746 A | 4/1999 | Bäversten et al. |
| 5,961,563 A | 10/1999 | Overton |
| 6,189,834 B1 | 2/2001 | Dietz et al. |
| 6,199,793 B1 | 3/2001 | Hainsworth et al. |
| 6,439,407 B1 | 8/2002 | Jacoff et al. |
| 6,533,220 B2 | 3/2003 | Schuster |
| 6,578,796 B2 | 6/2003 | Maeda |
| 6,588,985 B1* | 7/2003 | Bernard ............... B63C 11/42 166/338 |
| 6,708,926 B2 | 3/2004 | Bonisch |
| 6,983,833 B2 | 1/2006 | Ivers et al. |
| 7,028,351 B1 | 4/2006 | Frieder et al. |
| 7,267,240 B2 | 9/2007 | Maurer et al. |
| 7,720,582 B2 | 5/2010 | Makinadjian |
| 7,887,011 B1 | 2/2011 | Baldwin |
| 7,948,237 B2 | 5/2011 | Kuzmin et al. |
| 8,025,167 B2* | 9/2011 | Schneider ............ B66C 13/063 212/276 |
| 8,131,384 B2 | 3/2012 | Karpman et al. |
| 8,157,205 B2 | 4/2012 | McWhirk |
| 8,226,042 B1 | 7/2012 | Howell et al. |
| 8,413,923 B2 | 4/2013 | Brenner et al. |
| 8,534,607 B2 | 9/2013 | Tardiff et al. |
| 8,534,608 B1 | 9/2013 | Cox, IV |
| 8,840,355 B1 | 9/2014 | Kulesha |
| 8,886,402 B1 | 11/2014 | Lou |
| 8,888,048 B2 | 11/2014 | Figoureaux et al. |
| 8,894,050 B2 | 11/2014 | Wootten et al. |
| 8,899,903 B1 | 12/2014 | Saad et al. |
| 8,903,568 B1 | 12/2014 | Wang et al. |
| 8,938,325 B1 | 1/2015 | McGinnis et al. |
| 8,967,533 B2 | 3/2015 | DeVaul et al. |
| 9,027,976 B1 | 5/2015 | Tollenaere |
| 9,096,294 B1 | 8/2015 | Dong et al. |
| 9,114,871 B2 | 8/2015 | Woodworth et al. |
| 9,205,922 B1 | 12/2015 | Bouwer |
| 9,223,008 B1 | 12/2015 | Hartman et al. |
| 9,242,741 B1 | 1/2016 | Cockell, II |
| 9,302,770 B2 | 4/2016 | Burgess et al. |
| 9,676,481 B1 | 6/2017 | Buchmueller |
| 9,688,404 B1 | 6/2017 | Buchmueller et al. |
| 9,751,732 B2* | 9/2017 | May ...................... B66C 23/18 |
| 9,800,091 B2 | 10/2017 | Nugent, Jr. et al. |
| 9,836,063 B1 | 12/2017 | Bonawitz et al. |
| 9,881,506 B1 | 1/2018 | Gentry |
| 10,023,313 B2 | 7/2018 | Behrens et al. |
| 10,858,104 B2* | 12/2020 | Maghsoodi ............. B66D 1/54 |
| 11,008,198 B2* | 5/2021 | Sikora .................... B66C 13/08 |
| 2003/0085319 A1 | 5/2003 | Wagner et al. |
| 2003/0222177 A1 | 12/2003 | Bonisch |
| 2005/0242237 A1 | 11/2005 | Scott |
| 2007/0200032 A1 | 8/2007 | Eadie et al. |
| 2009/0004004 A1 | 1/2009 | Vincenzi |
| 2009/0152391 A1 | 6/2009 | McWhirk |
| 2010/0176618 A1 | 7/2010 | Souke et al. |
| 2011/0192932 A1 | 8/2011 | Brenner et al. |
| 2012/0145832 A1 | 6/2012 | Schuster |
| 2012/0150364 A1 | 6/2012 | Tillotson et al. |
| 2012/0292434 A1 | 11/2012 | Welsh |
| 2012/0293177 A1 | 11/2012 | Dodds |
| 2013/0054054 A1 | 2/2013 | Tollenaere et al. |
| 2013/0056586 A1 | 3/2013 | Occhiato et al. |
| 2013/0270393 A1 | 10/2013 | Shrapnel |
| 2013/0299634 A1 | 11/2013 | Haggard |
| 2014/0224755 A1 | 8/2014 | Eriksson et al. |
| 2014/0252170 A1 | 9/2014 | Prud'homme-Lacroix |
| 2015/0041598 A1 | 2/2015 | Nugent et al. |
| 2015/0360779 A1 | 12/2015 | Behrens et al. |
| 2016/0009393 A1 | 1/2016 | Repp et al. |
| 2016/0031683 A1 | 2/2016 | Fenker et al. |
| 2016/0048131 A1 | 2/2016 | Lesperance et al. |
| 2016/0236779 A1 | 8/2016 | Thomas et al. |
| 2016/0297650 A1 | 10/2016 | Bang |
| 2016/0332728 A1 | 11/2016 | Winfree et al. |
| 2016/0340039 A1 | 11/2016 | Waltner et al. |
| 2017/0088261 A1 | 3/2017 | Sequeira et al. |
| 2017/0138737 A1 | 5/2017 | Cordova et al. |
| 2017/0284795 A1 | 10/2017 | Carlson et al. |
| 2017/0291707 A1 | 10/2017 | Veronisi et al. |
| 2018/0099748 A1 | 4/2018 | Lesperance et al. |
| 2018/0282130 A1 | 10/2018 | Kale et al. |
| 2019/0193827 A1 | 6/2019 | Zerweckh |
| 2019/0241267 A1 | 8/2019 | Sikora et al. |
| 2020/0271270 A1* | 8/2020 | Sikora ................ F16M 13/005 |
| 2021/0017000 A1* | 1/2021 | Sikora ..................... B66C 13/08 |
| 2021/0017002 A1* | 1/2021 | Abdallah ............... B66C 23/88 |
| 2021/0122615 A1* | 4/2021 | Rauscher .............. B66C 13/063 |
| 2021/0229808 A1* | 7/2021 | Sikora ..................... B64D 9/00 |
| 2021/0371252 A1* | 12/2021 | Sikora ..................... B64D 1/08 |
| 2022/0121225 A1* | 4/2022 | Sikora ................. G06K 9/6288 |

FOREIGN PATENT DOCUMENTS

| | | |
|---|---|---|
| JP | H07179288 A | 7/1995 |
| JP | H1111859 A | 1/1999 |
| JP | 2016210607 A | 12/2016 |
| NO | 20171181 A1 | 1/2019 |

OTHER PUBLICATIONS

International Search Report dated Apr. 30, 2020, for PCT/US2020/017790, filed Feb. 11, 2020.

International Search Report dated May 27, 2020, for PCT/US20/19967, filed Feb. 26, 2020.

Written Opinion dated Apr. 3, 2019, for PCT/US19/13603, filed Jan. 15, 2019.

Written Opinion dated Apr. 30, 2020, for PCT/US2020/017790, filed Feb. 11, 2020.

Written Opinion dated May 27, 2020, for PCT/US20/19967, filed Feb. 26, 2020.

Young, L.A., "Enhanced Rescue Life Capability," 63rd Annual Forum of the AHS International, Virginia Beach, VA, May 1-3, 2007 (May 2007). Fig. 2, 5, 12, 16, Abstract pp. 6-12.

* cited by examiner

ём...

STATE INFORMATION AND TELEMETRY FOR SUSPENDED LOAD CONTROL EQUIPMENT APPARATUS, SYSTEM, AND METHOD

CROSS-REFERENCE TO RELATED APPLICATIONS

This application claims the benefit of the filing date of U.S. provisional patent application No. 62/833,394, filed on Apr. 12, 2019, and incorporates the subject matter thereof by this reference.

FIELD

This disclosure is directed to improved systems and methods for and related to an apparatus, system, and method to determine and report state information in relation to a load suspended by cable from helicopters, cranes, or the like.

BACKGROUND

People and/or equipment ("loads") may be transported to or from a location as a load suspended by a cable from a helicopter or crane, using a hoist system. The loads are typically not buoyant, though may be. Both cranes and helicopters may be referred to herein as "carriers". During such operations, loads are subject to winds and other external and internal factors that may cause the load to move in an unstable, unpredictable, undesirable, and/or hazardous manner.

Operators of carriers, such as helicopter and crane crews, may use equipment that provides control of a suspended load, including equipment that provides suspended load control remote from the carrier, e.g. at or near a load, using remotely powered fans. Such equipment is referred to herein as a suspended load control system ("SLCS").

In hoist and sling operations or otherwise when transporting a suspended load by a carrier, observed motion of suspended loads includes the following components: vertical translation (motion up and down) along the Y axis (referred to herein as "vertical translation"); horizontal translation along either or both the X and Z axis; and rotation or "yaw" about the Y axis. An example of X axis is illustrated in FIG. 10 at X axis 1011. An example of Y axis is illustrated in FIG. 10 at Y axis 1013. An example of Z axis is illustrated in FIG. 10 at Z axis 1012. An example of yaw is illustrated in FIG. 10 at yaw 1014. Roll (rotation about the X axis) and pitch (rotation about the Z axis) may also occur, though if a load is suspended by a cable and is not buoyant, the typical motions are vertical translation, horizontal translation, and yaw. Axis, when discussed herein, are relative to a normal axis of a suspended load, such as is illustrated in FIG. 10. Vertical and horizontal translation may be caused by movement of the suspension cable, movement of the carrier, winding of a wench up or down relative to a carrier, movement of the load, differences in speed and momentum between the load and the carrier, by wind—including propeller wash—impacts, and external forces. Horizontal translation can manifest as lateral motion or as conical pendulum motion of the load, with the pivot point of the pendulum where the cable is secured to the carrier ("pendular motion"); pendular motion generally also includes a component of vertical translation and may also be referred to as elliptical motion.

Yaw, lateral motion, and pendular motion complicate lift operations, cause delays, injury, and can lead to death of aircrew, crane operators, and of people on the ground. Yaw can produce dizziness and disorientation in humans and transported non-human animals. Yaw and lateral and pendular motion can also interfere with bringing a load into or delivering a load to a location. For example, delivery of a load to a deck of a ship may be complicated by pendular motion or yaw of the load, even if the deck is stable and is not also subject to heave, roll, or pitch, as it may be. For example, bringing a person in a litter into a helicopter or onto a helicopter strut may be hazardous if the litter is undergoing yaw or pendular motion as it is drawn up to the helicopter. One or more components of undesired motion of the load may increase in amplitude and/or frequency and otherwise grow more pronounced as a load is drawn up to the carrier and the suspension cable shortens. Horizontal and pendular motion of a load can also interact with the carrier to produce dangerous reactive or sympathetic motion in the carrier.

In addition, some suspended load operations may involve an obstacle, such as a surface, cliff wall, building, bridge, tree limb, overhang, or other obstacle that may interfere with one or more of carrier, load, and/or suspension cable.

Use of an SLCS, a carrier, and other components involved in control of a suspended load may be improved, made easier, less hazardous, and/or made more likely if the SLCS can produce, communicate, and act on state and telemetry data.

DETAILED DESCRIPTION

Figure 1:
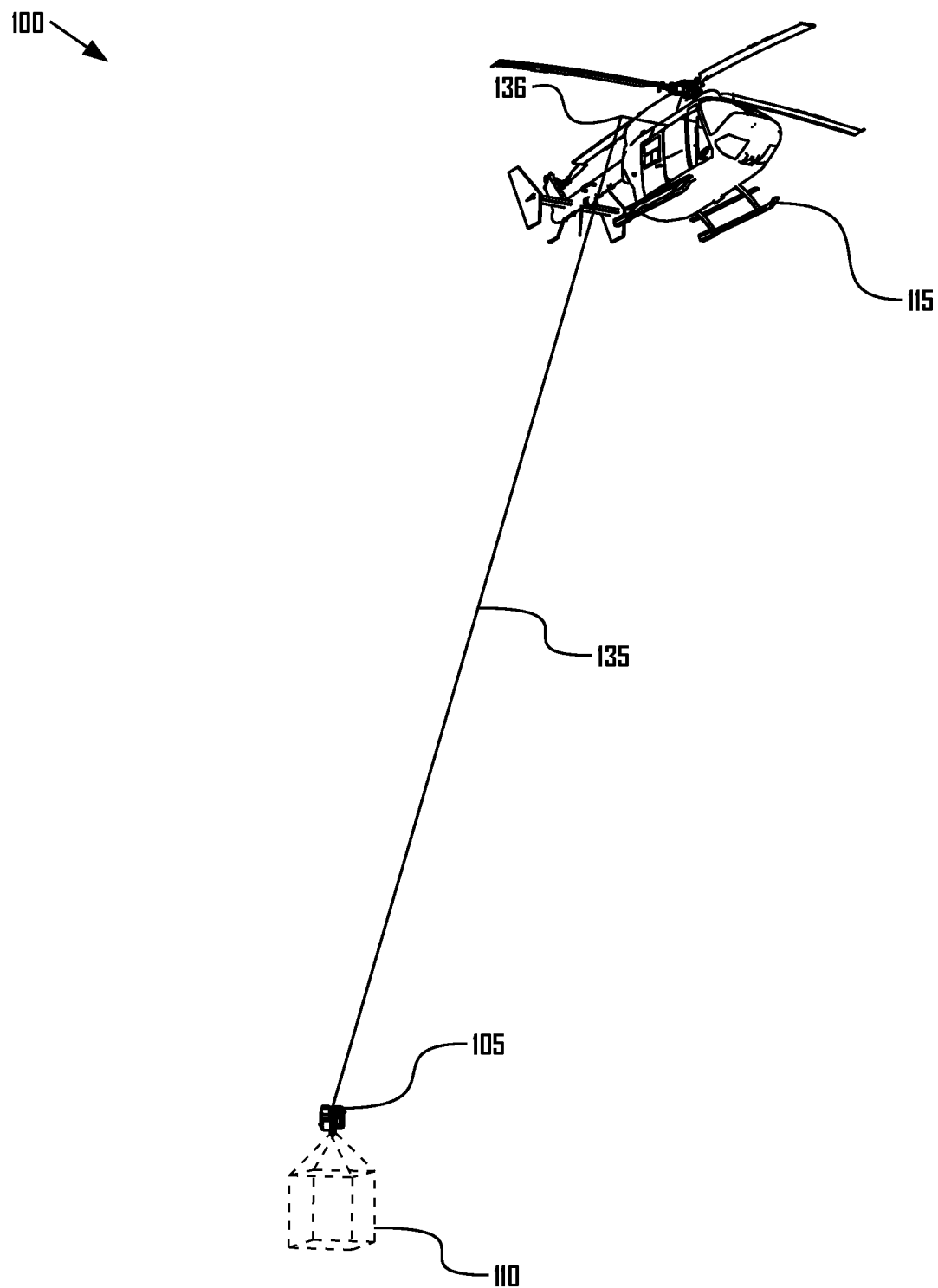
FIG. 1 illustrates a suspended load control system ("SLCS"), a load, and a helicopter from a perspective view slightly above the SLCS, in accordance with one embodiment.

Approaches to control suspended loads include countermeasures installed on a carrier. For example, some airframes, such as the Skycrane, have a rail system installed beneath a cabin to mitigate sway of a load, though, being remote from the suspended load, such rail system has margin effect. Some approaches to this problem involve automated countering algorithms in an aircraft's stability augmentation system, though, again, the effect of these measures is limited. At times, crew chiefs who remain within a helicopter during an extraction try to affect a suspended load by pushing or pulling a suspension cable from the helicopter; such efforts have limited effect and can be hazardous. Crane operators may move loads at slow rates to minimize pendular motion or may use additional suspension cables or dedicated control cables (whether on the ground, neighboring structures, or on the crane); these measures increase costs, complexity, and risk of failure. All such measures are inadequate and highly problematic.

In various embodiments, as described further herein, a suspended load control system addresses control of a load, independent from a carrier. The suspended load control system or suspended load stability system (referred to together as, "SLCS") of this disclosure estimates state information such as mass of SLCS and load, cable length (between a carrier and load), inertia of SLCS and load, movement and rotation SLCS, and movement and rotation of the carrier, and thrust output from fans or other thrust sources. The SLCS further estimates disturbances, such wind force, sea state, and relative SLCS and helicopter motion. This state information and disturbance forces are not "hard-wired" into the SLCS, but are and must be dynamically determined in order for the SLCS to change its behavior to address different operations and to address changing circumstances of a single operation.

With this complex state and disturbance model, the SLCS is able to control a load by dynamically exerting force from, for example, thrusters, fans, or propellers, as are found, for example, in high output electric ducted fans at, or near, a location of the load. High output electric ducted fans may be required in order to produce enough thrust to control a suspended load. Thrusters, fans, propellers and electric ducted fans are referred to herein as "EDFs". Other sources of thrust may be used, such as jets, compressed air, hydrogen peroxide thrusters, rockets, and the like.

Vector thrust force produced by EDFs may be used to counteract yaw and pendular motion, may be used to translate a load horizontally, such as to avoid an obstacle or to move a load into an offset position relative to a normal lowest-energy hanging position or "fall line" below an attachment point of a suspension cable on a carrier, such as below an arm that holds the suspension cable. An SLCS may be used to control the fine location and rotation of a load, independently from the carrier. Telemetry output from an SLCS may be used to provide feedback to a carrier crew or to processes executed by systems in a carrier. For example, the cable length estimated by an SLCS, or a location of an SLCS and load relative to a target or relative to the carrier may be output to a crew which controls a hoist or to a process which controls a hoist or to the hoist directly.

Consequently, an SLCS enhances mission safety and improves performance of carrier and suspended load operations as the SLCS dynamically determines and controls fine location and rotation of a load, separate from motion of the carrier, and as the SLCS provides telemetry information which may be used during a suspended load operation.

Once deployed and in-use, the SLCS is agnostic with respect to the platform from which the load is suspended (e.g., the characteristics of a helicopter "ownship", or a crane, etc.), as it independently and dynamically determines thrust necessary to stabilize the load or to direct the load in a desired direction, without producing thrust which might merely destabilize the load. This permits widespread adoption of the system regardless of carrier type, lowering cost and mitigating solution risks.

An SLCS can provide benefits to, for example, helicopter search and rescue, MEDEVAC, sling load operations, forest fire helicopters, crane operations, construction sling load operations, and civilian firefighting.

Control of an SLCS may require determining the position, orientation, and/or motion of an SLCS, of the carrier, and/or of a load; such information may be referred to herein as "state data", "state information", or "state parameters". A subset of state information may be reported to another system; when so reported, such subset of state information may be referred to as "telemetry data" or "telemetry information". Control of a carrier and/or components in a carrier, such as a wench or hoist which may be used in relation to an SLCS, may also be improved with state or telemetry information related to an SLCS, a load, and/or of a carrier. An SLCS may be used in contexts in which Global Position System (GPS) or other geolocation or radionavigation systems or other position and orientation systems are unavailable, are compromised, or are subject to latency. Redundancy in state and telemetry information may also be desirable to increase reliability in implementation of control systems and to decrease latency in providing telemetry information to such systems.

Control of an SLCS and a suspended load is different from control of other automated systems, such as cars and unmanned aerial vehicles, at least because an SLCS must dynamically and recursively estimate state information such as mass of SLCS and load, cable length, inertia of SLCS and load, movement and rotation SLCS, and movement and rotation of the carrier, as well as estimating disturbance forces, such as wind force, sea state, and relative SLCS and carrier motion.

Disclosed herein are one or more apparatuses, systems, and/or methods to determine state information, including cable length, mass, position, orientation, and/or motion information of an SLCS, a carrier, and/or of a load and to provide state information as telemetry data to one or more control apparatuses, systems, and/or methods which may be remote from the SLCS. These apparatus, systems, and/or methods are capable of determining state information at or by an SLCS, including in contexts in which radionavigation systems or other absolute and relative position and orientation systems are unavailable, are compromised, or are subject to latency or error.

As described further herein, these apparatus, systems, and/or methods may integrate machine-vision information with other sensor information, such as from an inertial navigation system and from LIDAR (possibly a portmanteau of "light and radar" or an acronym for "light detection and ranging"), to localize an SLCS relative to a carrier or another object. Machine-vision information may be produced through image capture by cameras in an SLCS and object detection of the carrier and/or load in such images; when integrated with information from inertial navigation system and LIDAR systems, localized relative state information (including relative orientation and position of the carrier, load and/or SLCS, and separate heading vectors of carrier and SLCS within a localized coordinate system) may be developed with low latency and high reliability. When absolute state information is available, such as from GPS or another radionavigation or absolute positioning system, absolute and relative localized state information may be integrated. Integration of machine-vision information with information from inertial navigation, LIDAR, and/or absolute position systems may be performed using methods that comprise, for example, a Kalman Filter, such as an Unscented Kalman Filter ("UKF") and state model.

As discussed, an SLCS and an attached load may rotate and/or may have a heading vector which follows a pendular path relative to a carrier's coordinate space. Relative and/or absolute state information developed according to the disclosure herein may be used to control or to enhance control of an SLCS or may be provided as telemetry to a carrier or a component within a carrier or to an object or persons on the ground or elsewhere.

Reference is now made in detail to the description of the embodiments illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of a helicopter sling load, search and rescue operations, and/or crane operations. However, these embodiments are illustrative examples and in no way limit the disclosed technology to any particular application or platform.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIG. 1 illustrates SLCS 105, load 110, and helicopter 115 from a perspective view slightly above SLCS 105, in an embodiment. An example embodiment of SCLS 105 and load 110 is further illustrated, with greater detail, in FIG. 10.

Figure 10:
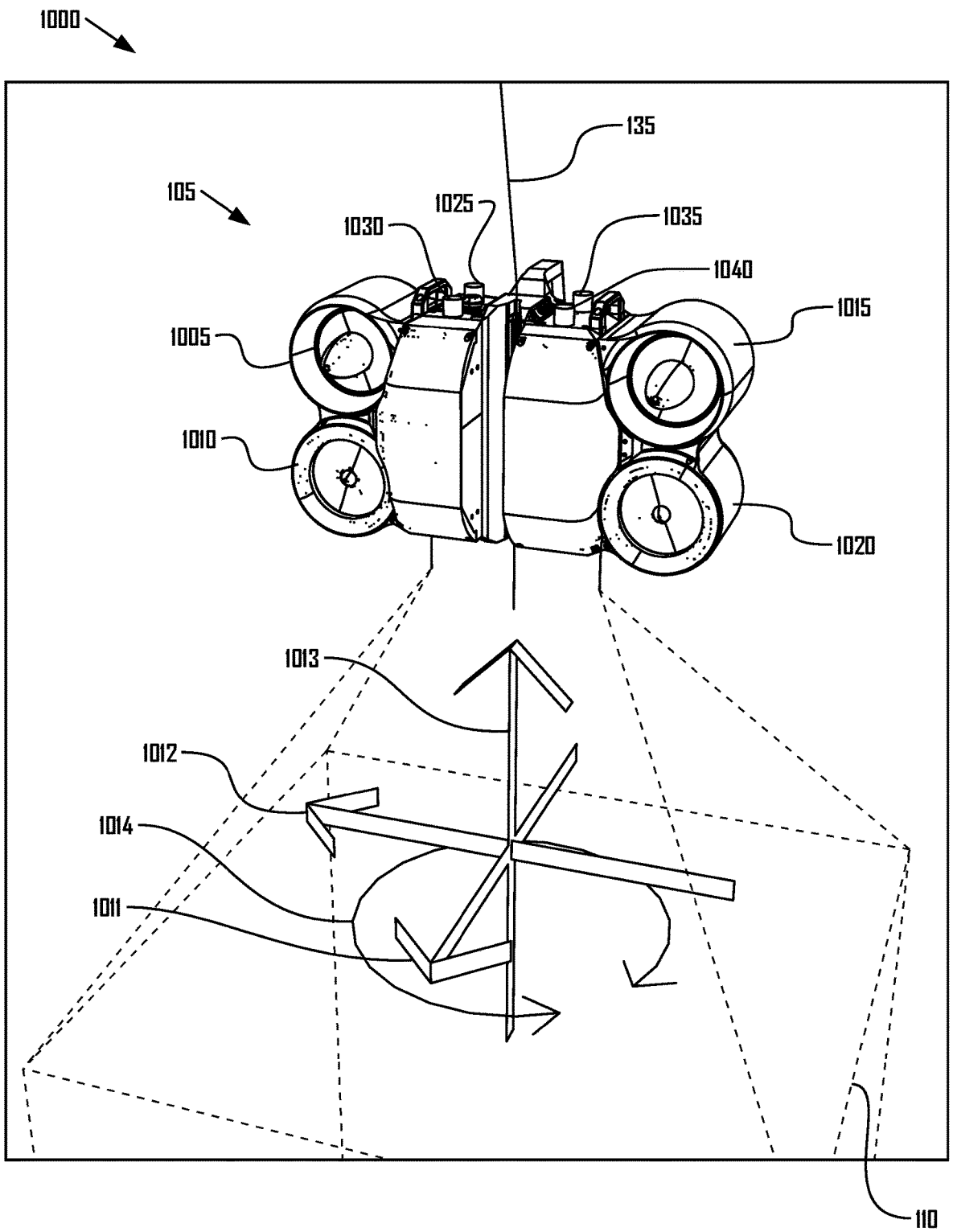
FIG. 10 illustrates a suspended load control system and load suspended from a suspension cable in accordance with one embodiment.

Referring to FIG. 10 and SLCS and suspended load 1000, SLCS 105 may comprise, for example, fan units 1005-1020. Fan units may comprise a cowl which protects one or more EDF. The cowl may be hardened, to withstand impact with the environment. The cowl unit may be made of metal, plastics, composite materials, including fiber reinforced resin, and the like. Fan units may include an air intake, though which air may be drawn, and an outlet. An air intake may comprise one or more screens or filters to prevent entry of some objects into EDF. The EDF in a fan unit may comprise blades and motor(s), such as electric motor(s). The electric motors within an EDF may be sealed against dust, sand, water, and debris. In addition to or in replacement of EDF, alternative sources of thrust may be used, such as, for example, compressed air, hydrogen peroxide jets or thrusters, liquid or solid rocket engines, fans driven by combustion engines, such as jet engines, and the like.

For the sake of convenience in discussing them, fan units on a first side of an SLCS, such as fan units 1005 and 1010 may be discussed as a first fan unit group while fan units on a second side, such as fan units 1015 and 1020, may be discussed as a second fan unit group. The fan units in each fan unit group propel thrust fluid (such as air) in fixed directions, such as fixed directions opposite each other; e.g. offset by 180 degrees. In other embodiments, a fewer or greater number of fan units and/or EDF may be used in an SLCS. In other embodiments, the fan units and/or EDF may be aligned other than offset by 180 degrees, e.g., offset by greater or fewer than 180 degrees, with or without offset along other of the axis. A mechanical steering component may be included to dynamically reposition a fan unit and/or EDF within a fan unit.

EDF in individual of the fan units may be activated separately, with different power, to produce thrust vectoring or thrust vector control of an assembly of fan units. For example, to produce clockwise yaw (relative to looking down on a top of SLCS 105 in FIG. 10), an EDF in the first fan unit group, such as fan unit 1010 may be activated by itself or in conjunction with an opposing EDF in the second fan unit group, such as fan unit 1015. To produce lateral translation of SLCS 105 or to produce lateral force opposing pendular motion, EDF in both fan unit groups with a same orientation may be activated, such as fan units 105 and 1015. Simultaneous lateral force and rotational force may be produced.

SLCS 105 may be formed of any suitable material such as metal, plastic, composite materials, such as fiber reinforced resin. A sealed hatch or one or more panels may be removed from an SLSC to allow for maintenance and inspection.

Load 110 in FIG. 1 may comprise one or more people, a litter, a container, an object, or the like. Load 110 is illustrated as being secured to two points on either side of SLCS 105, such that load 110 may not easily rotate, independent from SLCS 105, but is more likely to rotate with SLCS 105. A weight of load 110 may change during an operation, such as when part of a load is picked up or put down.

Suspension cable 135 in FIG. 1 may be, for example, a braided cable between SLCS 105 and/or load 110. SLCS 105 may comprise a cable entry channel, to receive a suspension cable, such as suspension cable 135. Cable entry channel may be angled inward, toward a cable receiving area. Cable receiving area may form a partially enclosed vertical channel between a fixed jaw and a moveable jaw within SLCS 105. SLCS 105 may comprise springs or another force-applying member to apply a compressive force to close a set of jaws on suspension cable 135, within the partially enclosed vertical channel between a fixed jaw and a moveable jaw. Together, the set of jaws may be understood as a "clamp" and may be referred to as a "jaw" or "jaw system". The jaw system may comprise a fixed jaw and a moveable jaw or a set of levers joined at a fulcrum. The jaw system may hold SLCS 105 on suspension cable 135. The length of suspension cable 135 may change during an operation, effecting behavior of the suspended load and response required by an SLCS.

Figure 9:
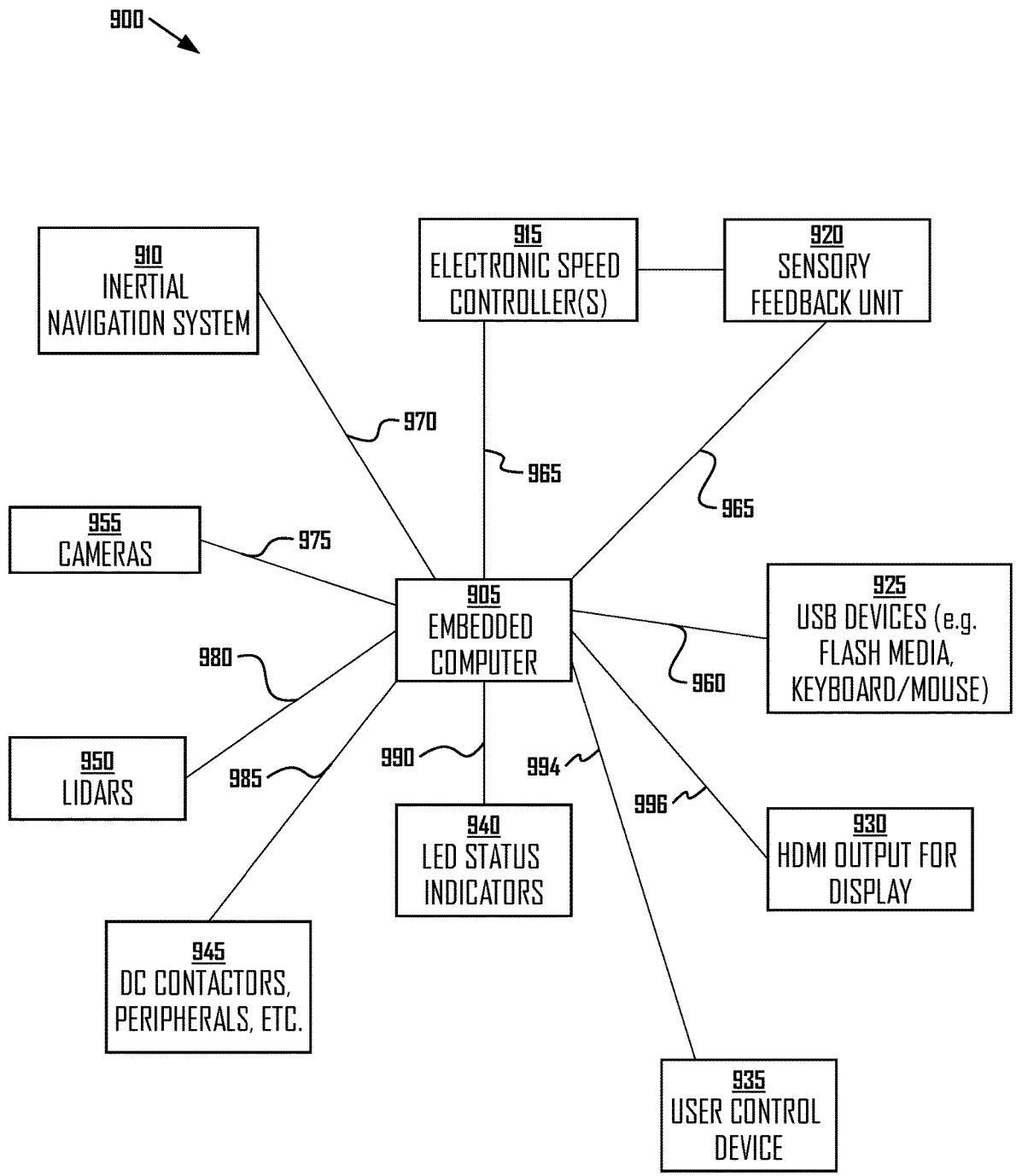
FIG. 9 schematically illustrates electronic computer, hardware, and network connections among operational components of a suspended load control system in accordance with one embodiment.

Status indicators may be mounted on various surfaces of the SLCS to aid in visibility and operation of the SLCS from above and below. For example, the SLCS may have external lighting, including visible and infrared (IR) LEDs, such as around the perimeter, to assist in identification of edges and orientation of the SLCS. This may allow for improved identification in hard viewing situations such as inclement weather and low. IR LEDs may be visible to humans using night vision goggle and/or to machine systems that can detect visible or IR electromagnetic radiation. During operation, both on the interactive display and the system body itself, LED display indicators may show that the system is active and may convey useful information. LEDs may also convey status of systems and/or components of the SLCS. An example of LED lights are illustrated in FIG. 9 as LED status indicators 940.

SLCS 105 may contain and protect computer hardware, such as a computer processor and memory, a power supply, electronic speed controllers, microcontrollers, sensors, and the like. Examples of such computer hardware are discussed in relation to FIG. 9.

The power supply within SLCS 105 may be a single power brick or an array of battery cells wired in series and/or in parallel, such as lithium-polymer (LiPo) cells. The batteries may be removable for inspection and/or to swap discharged and charged batteries. Batteries may be charged while installed in the SLCS (i.e., without having to remove them) via nodes or a wireless charging system on or in an SLCS that connect to a charging dock. Batteries may include auxiliary battery(ies) to supply a steady supply of power to the processor even if thrusters in fan units draw a relatively large amount of power from main batteries. In embodiments, a carrier from which the SLCS is suspended, such as a helicopter or crane, can provide power through a line extending down the suspension cable to the SLCS. In embodiments, the carrier can provide some power to the SLCS, while the SLCS may obtain other power from an on-board power supply. In various embodiments, the SLCS may be powered by a combination of on-board and remote power. In many environments, all power for the SLCS is contained on board the SLCS, allowing fully autonomous operation without dependence on the availability of external power sources or delivery means.

SLCS 105 may comprise a data link which allows a microcontroller unit or processor to monitor power information including (but not limited to) cell voltage and real-time power dissipation or consumption.

SLCS 105 may comprise one or more computer processors or central processing units (CPUs), such as embedded computer 905, and one or more microcontroller unit (MCUs). In some embodiments, the CPU and MCUs may be mounted to the same printed circuit board (PCB).

SLCS 105 may be made of or comprise a rugged plastic, metal, polymer, or combination thereof, protecting the system from environmental and operational factors such as weather and other operational conditions.

SLCS 105 may contain one or more wireless transceivers, which may comprise separate transmitter(s) and receiver(s), as well as antennas for wireless communication. The transceiver and/or wireless antennas may also be mounted to or printed on the same printed circuit board as the processor. The wireless transceivers may comprise access points for Bluetooth, Wi-Fi, microwave, and/or radio frequency (RF) transmission and reception. Wireless transceivers may be used to communicate with remote sensors, a remote control unit, a remote positional unit or target node, a remote interface, and the like, as discussed further herein.

As discussed herein, SLCS 105 may contain a vector navigation unit, which may include an inertial measurement unit ("IMU"), also referred to as an orientation measurement system. The IMU provides inertial navigation data to a processor, such as from 3 degree of freedom (3 DoF) accelerometers, gyroscopes, magnometer or magnetometer such as a compass, an inclinometer, a directional encoder, a radio frequency relative bearing system, and gravitational sensors, which may comprise microelectromechanical systems (MEMS) sensors. The IMU may include an integrated processor to provide on-board state estimation that fuses together data from the sensors in the IMU, in which case the IMU may be referred to as an Inertial Navigation System ("INS"). SLCS 105 may comprise or be communicatively coupled to one or more sensors in addition to the IMU. Such additional sensors may comprise, for example, an absolute position measurement system, a proximity sensor, LIDAR sensors and systems (e.g., point, sweeping, rotating, radial, distance, or linear), ultrasonic, and optical sensors such as one or more cameras or infrared (IR) sensors. Proximity sensors may include ground height sensors. The absolute position measurement system may include global positioning system (GPS) sensors. With a processor and memory, the IMU and GPS may also be referred to herein as an INS, such as inertial navigation system 910 of FIG. 9.

Sensors which require a view of a surrounding environment may be placed on or at the surface of SLCS 105. Examples of sensor locations for one or more of the foregoing are illustrated at sensor locations 1025, 1030, 1035, and 1040 in FIG. 10. Similar sensors and/or sensor locations may be on a bottom of SLCS 105. As discussed herein, information from sensors can be used by methods, apparatuses, and/or systems to determine state information; the raw data and/or determined state information or telemetry data may be provided to remote devices, processes, and humans, such as via wireline or wireless data links.

Additional SLCS sensors may include a strain sensor to gauge load on housings, on EDF(s), on conduits, on an attachment to a suspension cable, or the like. Additional sensors may include a rotational encoder or thruster speed sensor, such as sensory feedback unit 920 in FIG. 9, which may be incremental or absolute, and a shutdown pin presence sensor.

Also illustrated in FIG. 1 is arm 136. Arm 136 may be used to deploy and retrieve suspension cable 135 and SLCS 105. Arm 136 may comprise a wench to lower and hoist suspension cable 135 and SLCS 105.

As illustrated in FIG. 1, load 110 and SLCS 105 are offset from a fall-line beneath arm 136. This offset may be due to wind (whether environmental or from helicopter 115), wave or other forces which may have acted on load 110 and/or SLCS 105, change in speed of one or both of load 110 and helicopter 115, and the like.

As discussed herein, one or more computers, such as embedded computer 905, applies algorithms to received sensor data to estimate state information and output a desired system response. For example, data from IMU and GPS may be fused together through non-linear data fusion methods, such as real-time kinetic algorithms ("RTK"), Kalman filters, transfer functions, or Kalman filtration methods, such as an Unscented Kalman Filter ("UKF"), or through complimentary filters or transfer function models to yield optimal state estimates in all degrees of freedom to characterize the system's location and motion in relative or absolute coordinate frames, such as an aircraft relative defined frame or in geodetic space.

Figure 5:
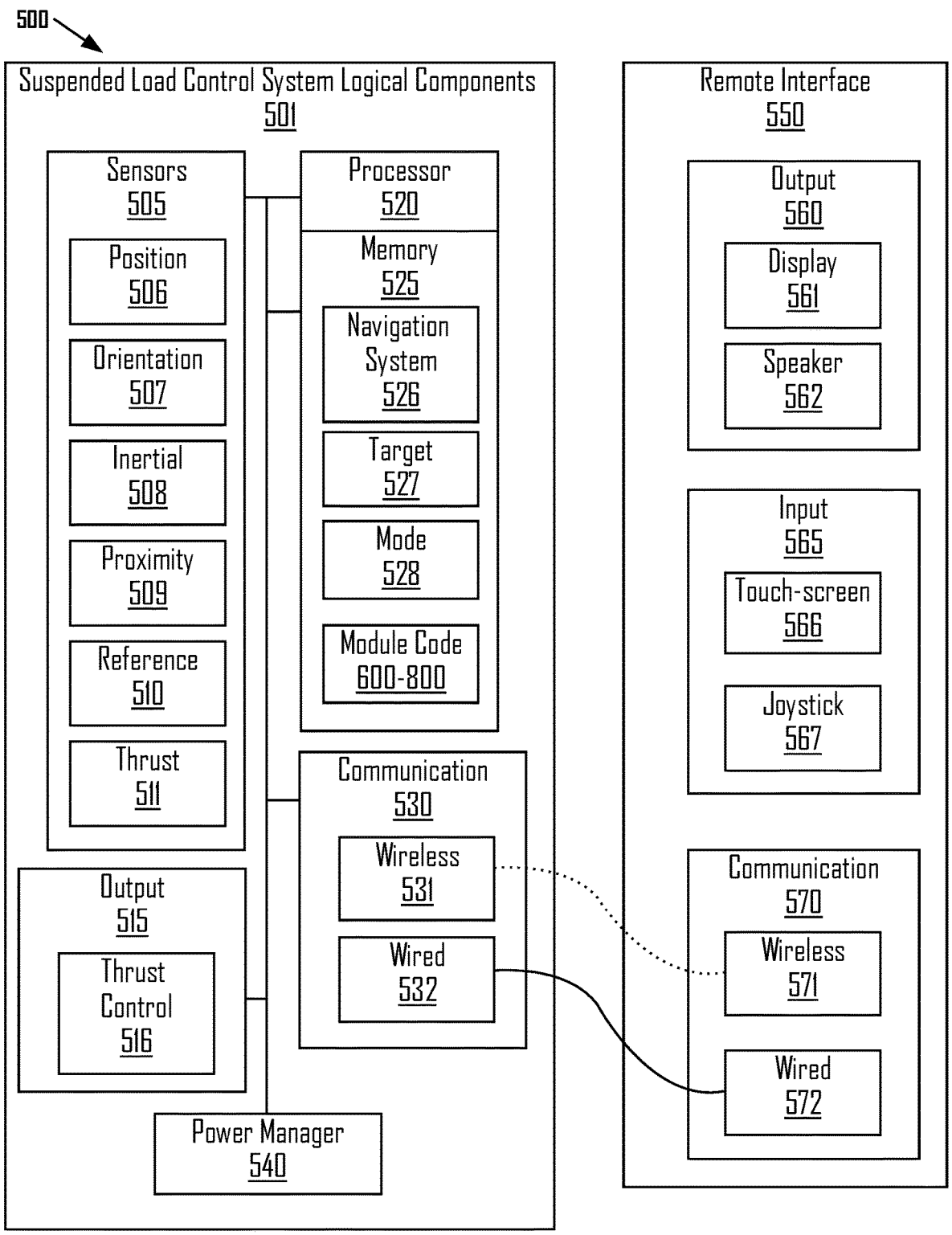
FIG. 5 schematically illustrates operational components of a suspended load control system including a remote interface, in accordance with one embodiment.

Examples of components which may be within SLCS 105 and within remote positional sensors or beacons, remote computational units, or target node transceiver devices are discussed further herein, such as in relation to FIG. 5 and FIG. 9.

Helicopter 115 in FIG. 1 represents any carrier.

Figure 2:
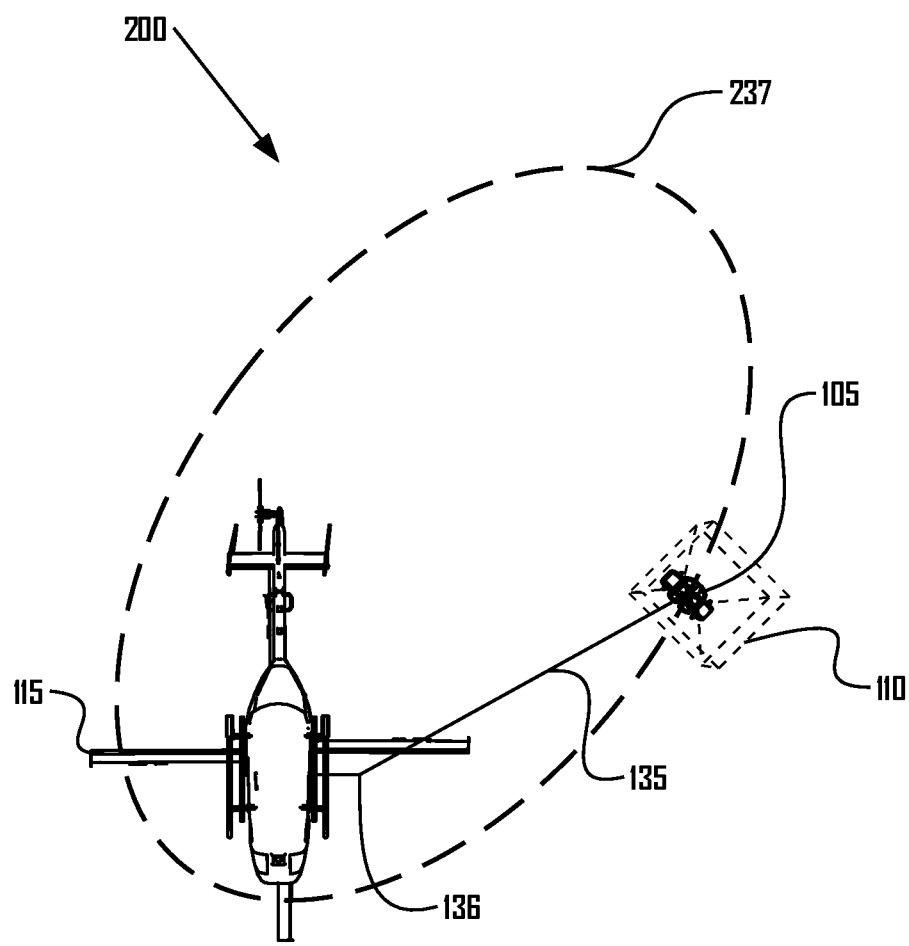
FIG. 2 illustrates SLCS, load, and helicopter of FIG. 1 in addition to an oscillation path or pendular motion of SLCS, from a perspective view below SLCS, in accordance with one embodiment.

FIG. 2 illustrates SLCS 105, load 110, and helicopter 115 of FIG. 1 as well as an example of an oscillation path 237 of SLCS 105, from a perspective view below the SLCS, in an embodiment. Oscillation path 237 illustrates pendular motion of a load which may be cause by movement of and/or interaction among helicopter 115, load 110, SLCS 105, wind, wave action, other external forces, and the like. Load 110 and/or SLCS 105 may also rotate about suspension cable 135. As discussed, such rotation and/or pendular motion may cause problems for transport and/or recovery of load 110 by helicopter 115. SLCS 105 may be able to estimate system information, including such motion, disturbance forces, and reduce or eliminate such undesirable motion.

Figure 3:
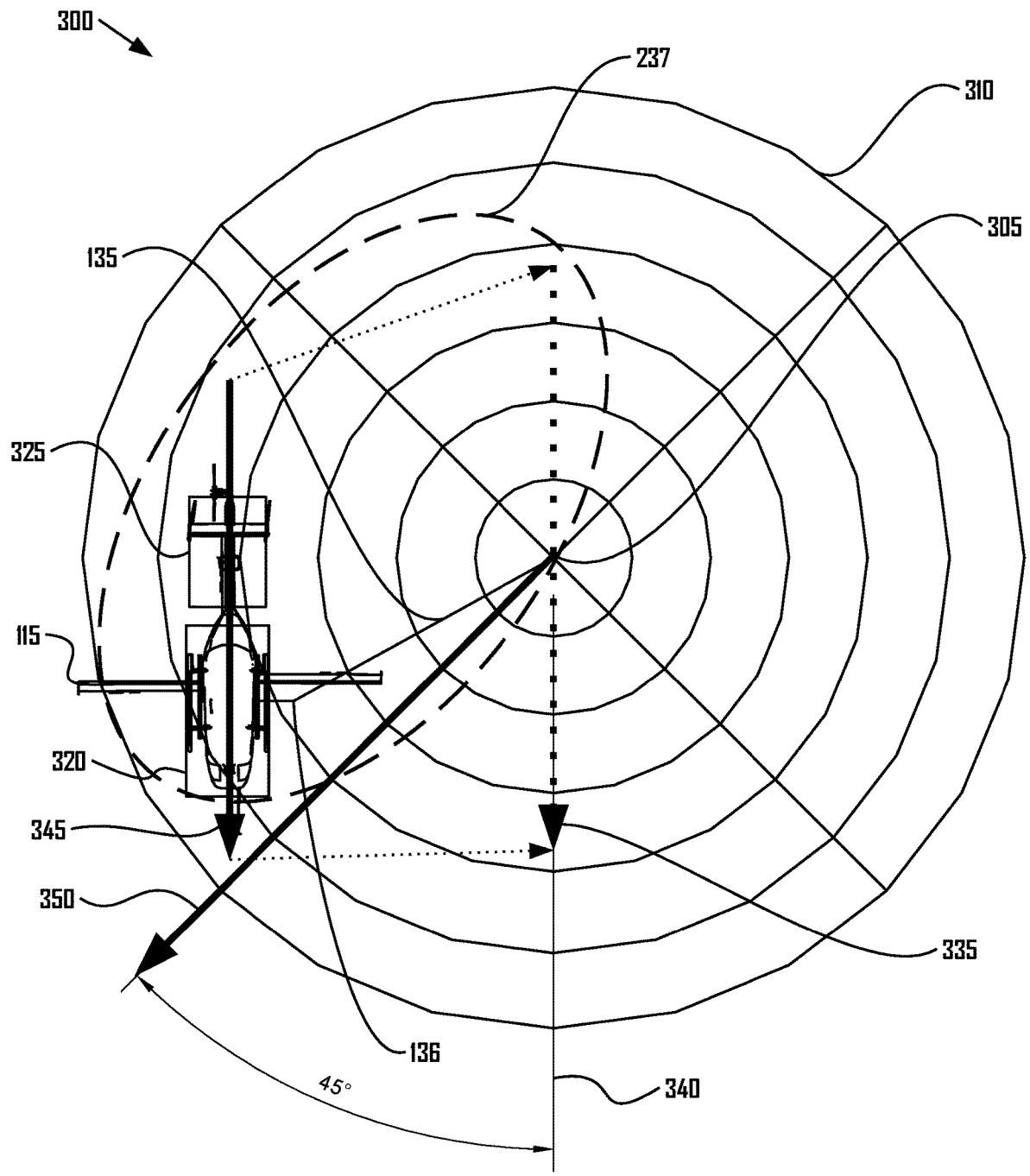
FIG. 3 illustrates a coordinate system relative to SLCS of FIG. 2, in accordance with one embodiment.

FIG. 3 illustrates coordinate system 310 relative to SLCS 105 from the view illustrated in FIG. 2, in an embodiment. In coordinate system 310, SLCS 105 may have SLCS normal orientation 350 (which may be consistent with X axis 1011 in FIG. 10). Coordinate system 310 may represent, graphically, for the reader of this paper, state information developed by data fusion and telemetry output module 800 with respect to helicopter 115 and the setting illustrated in FIGS. 1 and 2.

As discussed further herein, data fusion and telemetry output module 800 may perform object recognition to identify helicopter 115, helicopter cabin 320, and helicopter tail 325. Determination of helicopter cabin 320 and helicopter tail 325 may allow data fusion and telemetry output module 800 to determine that helicopter 115 has orientation 345. As illustrated in FIG. 3, orientation 345 may be rotated, relative to SLCS normal orientation 350. Data fusion and telemetry output module 800 may determine this relative rotation. For the sake of clarity for a reader of this paper, helicopter orientation 345 is transposed to centered helicopter orientation 335 and an angle of rotation, relative to SLCS normal orientation 350, is measured at 45 degrees in FIG. 3.

As discussed further herein, data fusion and telemetry output module 800 may also determine a height of helicopter 115 above SLCS 105. This determination may be based on one or more of LIDAR, object recognition, optical, IR, or microwave range or distance measurement, including from one or more data sources (such as stereo cameras), using signal time-of-flight information, detection of encoded laser light, UKF system models, or otherwise.

As discussed further herein, data fusion and telemetry output module 800 may also determine a relative offset between SLCS and arm 136. This offset is generally represented by radial lines in FIG. 3 around center-point 305.

As discussed further herein, data fusion and telemetry output module 800 may also determine change in the foregoing information over time, allowing data fusion and telemetry output module 800 to determine oscillation path 237 or pendular motion of SLCS 105 and load 110.

As discussed herein and as illustrated in FIG. 3, data fusion and telemetry output module 800 may thereby determine local relative position, orientation, movement over time, change in movement over time of SLCS 105 and helicopter 115, mass of SLCS 105 and load 110, distance below arm 136, all from data obtained locally by SLCS 105. Similar local relative state information of load 110 may be developed with information from sensors oriented toward load 110.

As discussed herein, data fusion and telemetry output module 800 or another module may integrate this local relative state information with absolute position information, such as from a GPS or other geolocation or radionavigation systems. In this way, data fusion and telemetry output module 800 may develop critical local and absolute state information of an SLCS, a load, and/or a carrier.

As discussed herein, communication systems, such as communication 530 module within SLCS logical components 501, may communicate local and/or absolute telemetry information to an interactive display or remote interface of an SLCS or to other systems, such as a control system for a hoist in or coupled to arm 136.

Figure 4:
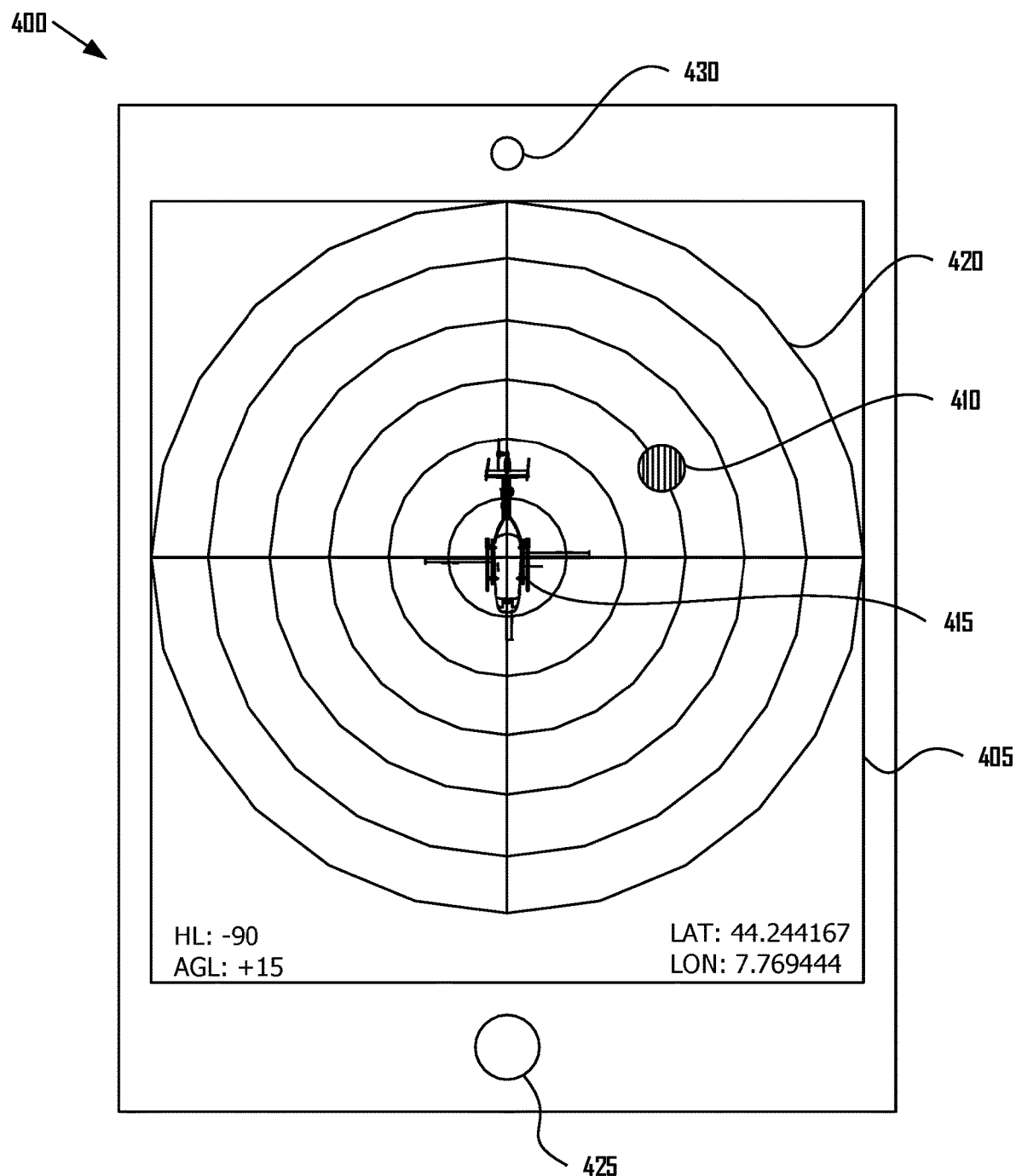
FIG. 4 illustrates a display of an interactive display or remote interface of an SLCS, in accordance with one embodiment.

FIG. 4 illustrates display 400 of an interactive display or remote interface of an SLCS, in an embodiment. Display 400 is an example embodiment of interactive display or remote interface 550, discussed further herein in relation to FIG. 5.

FIG. 5 schematically illustrates logical components of SLCS 500 including SLCS logical components 501 and remote interface 550 in accordance with one embodiment.

Referring to both FIG. 4 and FIG. 5, interactive display or remote interface 550 may be a computational unit that can be self-powered or hardwired into an airframe or other carrier. Display or remote interface 550 receives data, such as telemetry data, from an SLCS, e.g., wirelessly. The data from the SLCS may be parsed and converted to visual cues or visual information and displayed on display 561, an example of which may be illustrated in display 400.

An example of an embodiment of a user interface (UI) of interactive display or remote interface 550 is illustrated in FIG. 4 as display 400. For example, in FIG. 4, label 410 may represent a location of an SLCS and a load. Display 400 may further communicate the height or distance of the SLCS below the carrier, such as via the size of label 410 and/or in text, such as "HL:−90", which may mean that the length of suspension cable is 90' below the carrier. As discussed further herein, the length of suspension cable below the carrier may be calculated by, for example, data fusion and telemetry output module 800, based solely on sensor information generated at the SLCS, such as SLCS 105. Display 400 may further communicate the height or distance of the SLCS and/or load above the ground, such as via a color of label 410, through another graphical representation, and/or in text, such as "AGL:+15", which may mean that the SLCS and/or load is 15' above ground level. Display 400 may further communicate the absolute position of the carrier and/or of the SLCS and/or load, such as "LAT: 44.244167 LON: 7.76944".

The interactive display also communicates an operator's desired command states to an SLCS, as discussed herein. Desired command states may be communicated verbally, by touching (including repeated or sustained touch) of display 400, by dragging objects on display 400, by pushing buttons, whether graphical buttons on a touchscreen or physical buttons such as button 425, by entry of text commands, through a keyboard, and the like.

The interactive display or remote interface 550 is in communication with SLCS logical components 501 via communication systems 570, which may be wireless 571 or wired 572. Output 560 from remote interface 550 may include information displayed on a screen 561, represented in FIG. 4 as screen 405, and audio cues 562. Input 565 to remote interface 550 to control the SLCS may include commands conveyed through a touchscreen 566, such as via screen 405, a joystick 567, a microphone, a camera, such as camera 430, button 425, or the like. In various embodiments, remote interface 550 and/or display 400 may comprise one or more physical and/or logical devices that collectively provide the functions described herein. Another example of an embodiment of remote interface 550 is illustrated and discussed in FIG. 11A, FIG. 11B, and FIG. 11C.

As illustrated in the embodiment illustrated in FIG. 5, within SLCS logical components 501 are sensor suite 505, which may include position sensors 506, orientation sensors 507, inertial sensors 508, proximity sensors 509, reference location sensors 510, and thrust sensors 511. Examples of embodiments of such sensors are discussed further herein, such as in relation to IMU, absolute position measurement systems, and as discussed in relation to FIG. 9, such as inertial navigation system 910, cameras 955, LIDARS 950, DC contactors, peripherals, etc. 945, and sensory feedback unit 920.

SLCS processor 520 may include one or more processor and/or microcontrollers. An example of a processor and/or microcontroller is embedded computer 905 of FIG. 9.

SLCS memory 525 may generally comprise a random access memory ("RAM"), a read only memory ("ROM"), and a permanent non-transitory mass storage device, such as a disk drive or SDRAM (synchronous dynamic random-access memory).

SLCS memory 525 may store program code for modules and/or software routines, such as, for example, navigation system 526, operational module 600, decision and control module 700, and data fusion and telemetry output module 800, as well as data or information used by modules and/or software routines, such as, for example, target data 527, and mode or command state information 528.

Memory 525 may also store an operating system. These software components may be loaded from a non-transient computer readable storage medium into memory 525 using a drive mechanism associated with a non-transient computer readable storage medium, such as a floppy disc, tape, DVD/CD-ROM drive, memory card, or other like storage medium. In some embodiments, software components may also or instead be loaded via a mechanism other than a drive mechanism and computer readable storage medium (e.g., via a network interface.

Memory 525 may also comprise a kernel, kernel space, user space, user protected address space, and a datastore.

Memory 525 may store one or more process (i.e., executing software application(s)). Process may be stored in user space. A process may include one or more other process. One or more process may execute generally in parallel, i.e., as a plurality of processes and/or a plurality of threads.

Memory 525 may further store an operating system and/or kernel. The operating system and/or kernel may be stored in kernel space. In some embodiments, the operating system may include a kernel. The operating system and/or kernel may attempt to protect kernel space and prevent access by certain of the processes.

The kernel may be configured to provide an interface between user processes and circuitry associated with embedded computer 905. In other words, the kernel may be configured to manage access to embedded computer 905, a chipset, I/O ports and peripheral devices by processes. The kernel may include one or more drivers configured to manage and/or communicate with elements of operational components of SLCS 500 and 900 (i.e., embedded computer 905, chipset, I/O ports and peripheral devices).

Processor 520 may also comprise or communicate via a bus and/or a network interface with memory 525 or another datastore. In various embodiments, such a bus may comprise a high speed serial bus, and a network interface may be coupled to a storage area network ("SAN"), a high speed wired or wireless network, and/or via other suitable communication technology.

SLCS logical components 501 may, in some embodiments, include many more components than as illustrated. However, it is not necessary that all components be shown in order to disclose an illustrative embodiment.

The data groups used by modules or routines in memory 525 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

Communication system(s) 530 may include wireless system(s) 531 such as the wireless transceiver, and wired system(s) 532. SLCS output 515 includes thrust control 516 via thruster controllers. Power managing systems 540 regulate and distribute the power supply from, e.g., the batteries. One or more data connectors, data buses, and/or network interfaces may connects the various internal systems and logical components of the SLCS. Examples of data connectors and/or data bus are illustrated in FIG. 9, at data connector elements 965 to 996.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), the Internet, or any radio frequency communication technology. Data from an SLCS may be of very low bandwidth and may not be restricted to a frequency or communication protocol. In a distributed computing environment, modules can be located in both local and remote memory storage devices. As schematically illustrated in FIG. 5, SLCS logical components 501 and remote display interface 550 may be connected by wired or wireless networks.

An SLCS may work with a remote positional unit or target node of a suspended load control system in accordance with one embodiment. The remote positional unit or target node may comprise an external sensor suite or beacon configured to communicate, such as wirelessly, with the SLCS as a positional reference. If the SLCS is considered the primary sensor suite, a secondary sensor suite location can be the platform or carrier from which the cable is suspended, and a tertiary sensor suite location can be a location of interest for the load (e.g., for positioning to obtain or deliver the load).

A remote positional unit can include a positional transceiver configured to communicate with the SLCS via its wireless transceiver and provide a positional reference. For example, a remote positional unit can be attached to a helicopter ownship or crane below which a load may be suspended.

In some embodiments, the remote positional unit or target node may be made of durable polymer or plastic, large enough to fit into a hand. The remote positional unit or target node may have an external antenna. The remote positional unit or target node may be attached to, e.g., the helicopter by magnets, bolts, or any other attachment mechanism. The remote positional unit or target node may be dropped to a location on the ground or attached to, e.g., a life preserver or other flotational device, a rescuer, a load to be picked up, a location for a load to be delivered, or an operational specific location.

Aspects of the system can be embodied in a specialized or special purpose computing device or data processor that is specifically programmed, configured, or constructed to perform one or more of the computer-executable instructions explained in detail herein, such as embedded computer 905. Aspects of the system can also be practiced in distributed computing environments where tasks or modules are performed by remote processing devices that are linked through a communications network, such as a local area network (LAN), wide area network (WAN), or the Internet. In a distributed computing environment, modules can be located in both local and remote memory storage devices. As schematically illustrated in FIG. 5, SLCS logical components 501 and remote display interface 550 are connected by a wired or wireless network.

Figure 6:
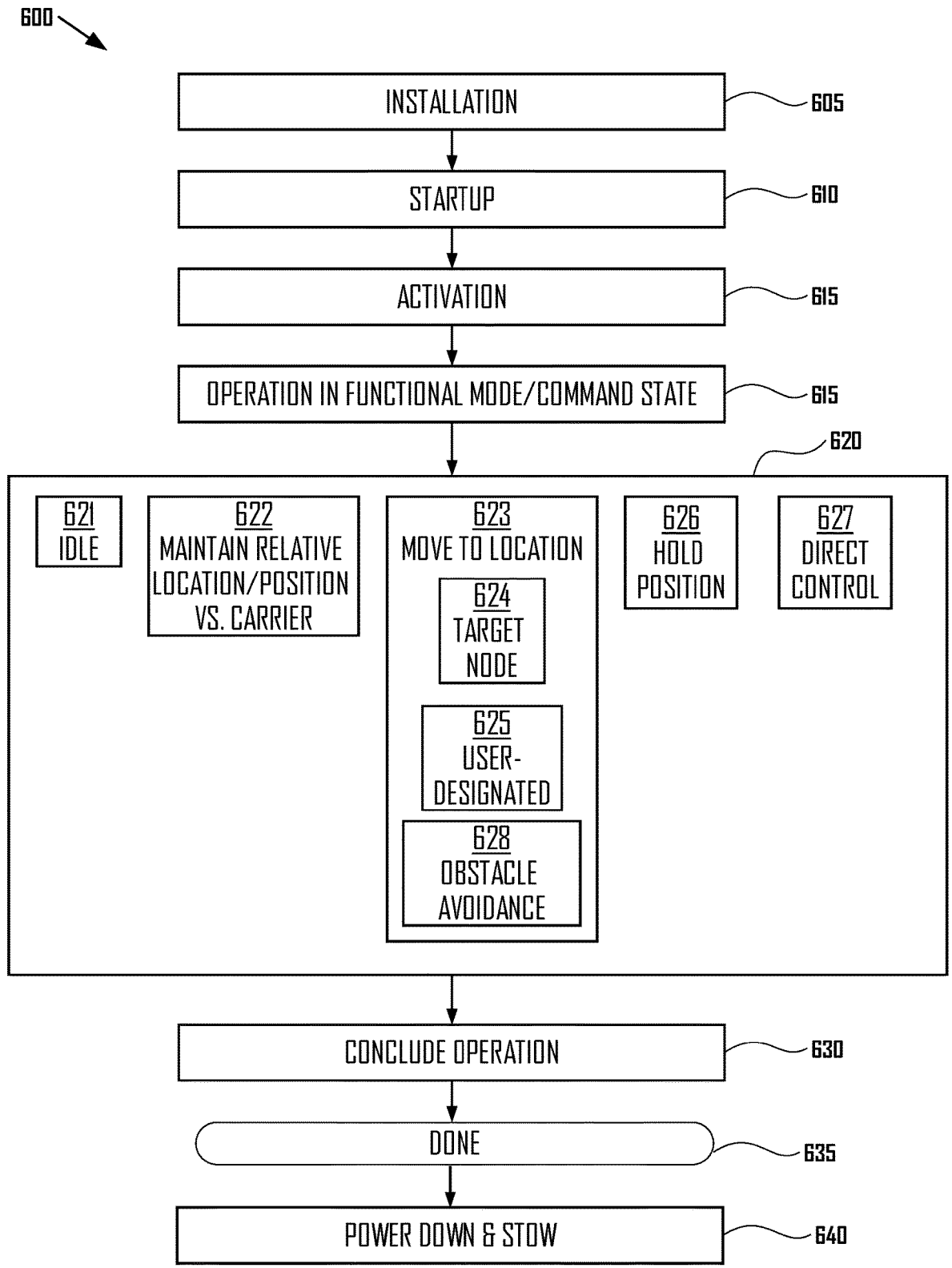
FIG. 6 illustrates an operational module of a suspended load control system including multiple modes or command states in accordance with one embodiment.

FIG. 6 illustrates an operational module 600 of a suspended load control system ("SLCS") including multiple modes or command states in accordance with one embodiment. Instructions of, or which embody, decision and operational module 600 may be stored in, for example, memory 525, and may be executed or performed by, for example, processor 520, as well as by electrical circuits, firmware, and other computer and logical hardware of SLCS with which operational module 600 may interact. In embodiments, computer processors and memory to perform some or all of operational module 600 may be remote from SLCS, such as in an auxiliary computer in, for example, a carrier.

In block 605, the SLCS apparatus may be installed onto a load and/or cable from which the load will be suspended. The SLCS apparatus need not be powered for installation.

In block 610, the SLCS in the apparatus may be started up and operational module 600 activated, if it is not already operating. In some embodiments, operational module 600 may be initialized by the press of a button located on the face of the center module of the SLCS. Near the accessible external button which may initialize operational module 600, another button may be present that allows for immediate system shut down when pressed. In addition to the initialization interface on the center module, operational module 600 may be initialized by an operator not directly next to the system. One or more external operators, including but not limited to a rescuer on the end of the cable, may initialize operational module 600 by pressing a button on one or more interactive displays 650 linked wirelessly to operational module 600.

One or more modules of a complete SLCS, such as physically separated control unit, fan unit, and the like, may be started up in block 610 and may be paired to function together. During block 610, operational module 600 may determine a relative orientation of fan units which operational module 600 is to control. This determination may be based on sensor information from the fan units, such as a compass heading sampled from each fan unit. This determination may be performed to adjust for fan units which are not parallel to one another, as may be the case when a modular SLCS is deployed on an irregular load, such as a rope or webbing enclosed load, and the fan units may not be parallel. This determination may be used in, for example, block 745, with respect to fan mapping and determination of an actuator mix. This determination may not be necessary when the SLCS is in a rigid frame and the fan units may be presumed to be, for example, parallel to one another. This determination may produce an error condition if the fan units are not within an acceptable orientation range.

In block 615, operational module 600 is activated in and/or receives a functional mode or command state selected by the operator.

In block 620 and a functional mode or command state, operational module 600 may perform or call suspended load control decision and control module 700 as a subroutine or submodule, to implement a functional mode or command state. The functional modes or command states of the system are and perform the following:

Idle mode 621: all internal systems of the SLCS are operating (e.g., operational module 600 observes motion of the SLCS and calculates corrective action), but thrusters are shut off or maintain an idle speed only, without action to affect the motion of the load.

Maintain relative position relative to ownship mode 622: stabilizes the SLCS with respect to a slung origin point. For example, when the SLCS is suspended with a load below an arm of a helicopter, the SLCS will stay directly below the arm. Maintain relative position relative to ownship mode 622 localizes the ownship motion and performs the corrective actions necessary to critically damp any other suspended load motion. If the ownship is traveling at a low speed, maintain relative position relative to ownship mode 622 will couple the velocity so the two entities move in unison. Upon a disturbance to the load, maintain relative position relative to ownship mode 622 provides thrust in the direction of the disturbance to counteract the disturbance, eliminating the swing.

Move to/stop at position mode 623: will stabilize an SLCS to a fixed position, counteracting the influence of the weather or small movements of the helicopter or other carrier. This mode has the effect of trying to eliminate all motion. The operator may send a desired target position to the SLCS via the remote interface 650. This may be accomplished in at least two ways:

Target node position 624: The operator may place an SLCS remote positional unit or target node 510 at the desired lowering location. The target node 510 will communicate wirelessly with the SLCS to indicate the desired position, and the SLCS responds by maneuvering to the desired location. The remote interface 550 UI, such as display 400, may receive and display the location information of both entities.

User-designated position 625: The operator may use remote interface 550 UI, such as display 400, to send a designated position (e.g., latitude and longitude coordinates) as a commanded location to the SLCS. The system will then steadily direct the suspended load toward the desired position. The system will simultaneously send feedback to the remote interface 550 UI, such as display 400, regarding position and distance information.

Hold Position mode 626: will resist all motion of an SLCS and maintain current position and/or orientation independent of the ownship's motion. This mode has the effect of eliminating or dampening all motion. This mode has conditional responses respectively to ownship speed, safety factors, and physical constraints.

Direct control mode 627: Joystick operation of the SLCS in three degrees of freedom. Though operational module 600 is entirely closed-loop and does not require external control during operation, there may be an option for user control. The operator may be able to directly control positioning, rotation, and thruster output level.

Obstacle avoidance module 628 module: receives and processes sensor information such as to i) to equalize the distance between sensor locations, such as at fan units and objects, such as obstacles, sensed in the environment or ii) to measure or receive geometry of a load, measure geometry of obstacles sensed in the environment, determine or receive the position, orientation, and motion of the load, and negotiate the load relative to the obstacle.

In block 630, the operator may complete the operation and retrieves the SLCS apparatus.

In done block 635, operational module 600 may be shut down, such as by an interrupt condition, such as by pushing a button on the interactive display or by pressing a button on the center module itself. At done block 635, operational module 600 may exit or return to another process.

At block 640, if the SLCS apparatus includes collapsible propulsion arms or the like, they can be folded up. The load may be detached from a load hook and the SLCS apparatus may be removed from the suspension cable, such as by being detached from a hoist ring at the top of the SLCS. The SLCS may then be stowed in its charger or any convenient location.

Figure 7:
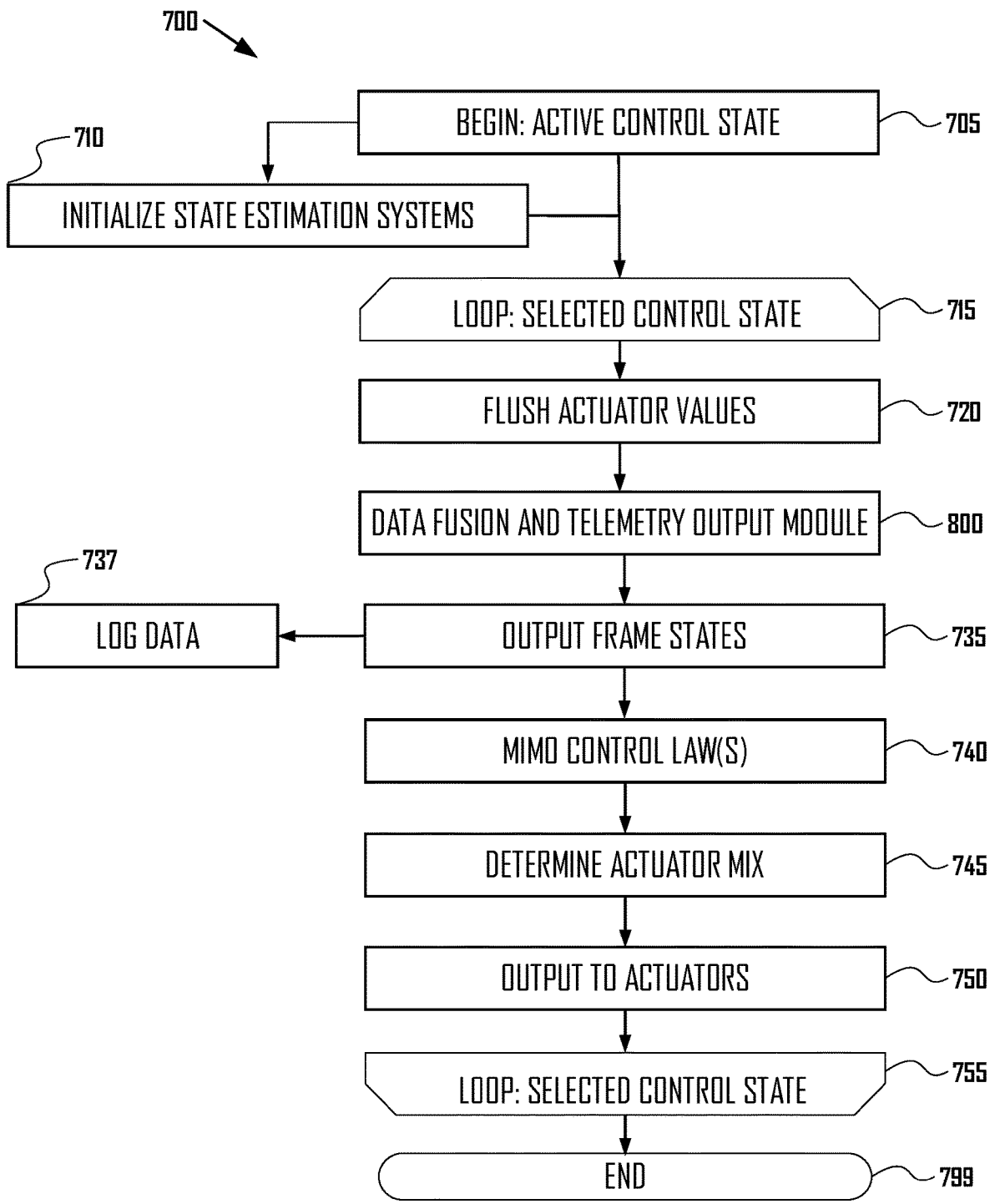
FIG. 7 illustrates a decision and control module of a suspended load control system in accordance with one embodiment.

FIG. 7 illustrates decision and control module 700 of an SLCS in accordance with one embodiment. Instructions of, or which embody, decision and control module 700 may be stored in, for example, memory 525, and may be executed or performed by, for example, processor 520, as well as by electrical circuits, firmware, and other computer and logical hardware of SLCS with which decision and control module 700 may interact. In embodiments, computer processors and memory to perform some or all of decision and control module 700 may be remote from SLCS, such as in an auxiliary computer in, for example, a carrier.

Decision and control module 700 may operate in a closed loop to develop relative and absolute telemetry information, send this data to remote locations, perform a set of calculations to determine the most desired response, then send the desired response to the air propulsion thruster array, for example, to mitigate pendular motion or swing of the cable and suspended load, rotation of the SLCS and suspended load, or otherwise control a suspended load during operations. This process may operate in a continuous loop as long as the system is powered on and a suitable command state is active. This process may operate with data received only from sensors in an SLCS, such as SLCS 105.

In block 705, an SLCS has been deployed, such as onto a suspension cable, has been activated, and decision and control module 700 begins active control state, such as upon being powered on, initialized, or otherwise commanded, either by a user or another process, such as operational module 600. At block 710, if newly activated, decision and control module 700 initializes state estimation systems.

Begin loop block 715 to closing loop block iterate over a command state, such as one selected in block 620 of operational module 600.

In block 720, decision and control module 700 may flush actuator values, e.g. values sent to actuators, such as EDFs. This may ensure that old values do not contaminate a then-current process loop.

Figure 8:
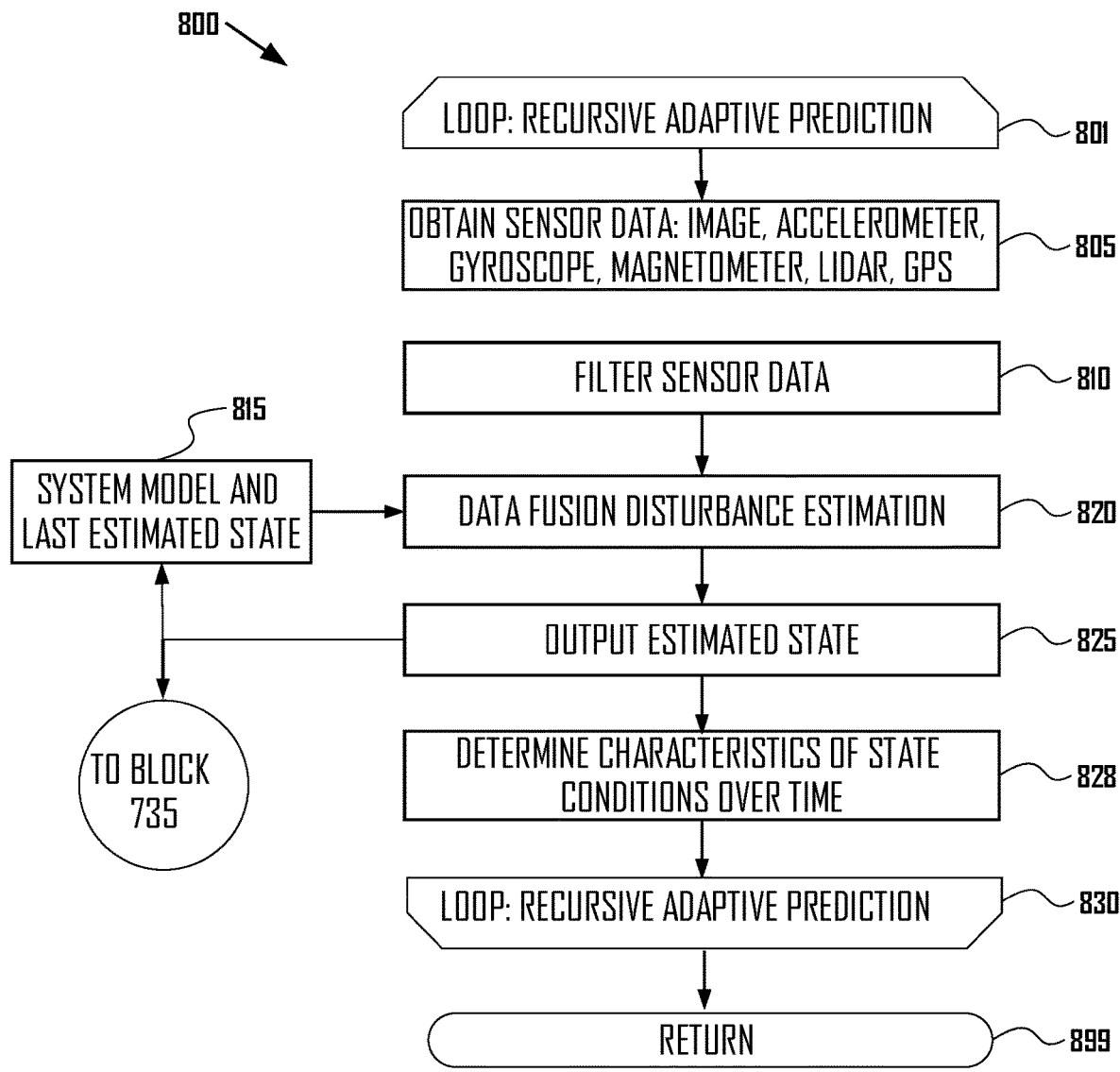
FIG. 8 illustrates a data fusion and telemetry output module, in accordance with one embodiment.

At block 800, decision and control module 700 may enter data fusion and telemetry output module 800, discussed further in relation to FIG. 8. In overview, data fusion and telemetry output module 800 fuses local motion-based and absolute sensor information to create a deterministic state estimation of state data of the SLCS and carrier coordinate frame. An example is discussed in relation to FIG. 3. In overview, data fusion and telemetry output module 800 is updated with most recent values from the sensory suite onboard the SLCS. These values may be obtained in a separate process thread, separate from data fusion and telemetry output module 800. The measurements are passed to state estimation algorithms, in which data fusion and non-linear state estimation is implemented. Please see, for example, data fusion and telemetry output module 800.

At block 735, decision and control module 700 may output updated frame states, which may be logged at block 737.

At block 740, decision and control module 700 may pass the updated frame states of block 735 to multi-input multi-output ("MIMO") control laws. The MIMO control laws may determine an optimal, quantified, correction force based on weighting of severity of current states, and decides how the SLCS should move or exert force to achieve the determined thrust and orientation of the SLCS set by the user-selected functional mode or command state. For example, weighted control laws may include proportional integral derivation ("PID") with respect to both position and motion. Between the two, severity of motion may dominate relative to position. Control methods weighing cost in terms of energy use may also be considered, as well as additional feedback from past output control to actuators 750. Output of MIMO control laws may comprise one or more vectors.

At block 745, determination of actuator mix may be determined, e.g. which EDF to activate and how much. This may be determined according to a matrix which receives vectors from the MIMO control laws and determines corresponding actuator values. Net thrust output is mapped in real-time through encoders and load cells. This determination may first attempt to reduce rotation of a load, such as by generation of a torque force by the SLCS, before attempting to reduce or induce lateral translation of a load.

At block 750, decision and control module 700 may output instructions to the actuators to activate them according to the actuator mix determined in block 745. The result may implement a dynamic response in the form of thrust counteracting unwanted motion or thrust to achieve a desired motion.

In closing loop block 755, decision and control module 700 may return to opening loop block to continue iterating over the then-current command state until an exit condition occurs. Exit conditions may include, for example, achieving an objective, such as obtaining or becoming proximate to a location, obtaining a location for a period of time, obtaining a location and receiving an acknowledgment signal, occurrence of an error, or receiving an instruction to exit.

At end block 799, decision and control module 700 may exit or return to another process. The process may be unmanned and automated aside from the high-level operator-selected functional control modes. The net output is a force to control or stabilize a suspended load.

FIG. 8 illustrates data fusion and telemetry output module 800, in accordance with one embodiment. Instructions of, or which embody, data fusion and telemetry output module 800 may be stored in, for example, memory 525, and may be executed or performed by, for example, processor 520, as well as by electrical circuits, firmware, and other computer and logical hardware of SLCS with which data fusion and telemetry output module 800 may interact. In embodiments, computer processors and memory to perform some or all of data fusion and telemetry output module 800 may be remote from SLCS, such as in an auxiliary computer in, for example, a carrier.

In data fusion and telemetry output module 800, local motion-based sensor and absolute position sensor information is fused to create a deterministic state estimation in a coordinate frame of an SLCS and carrier. An example of a data fusion and disturbance estimation algorithm is an Unscented Kalman Filter ("UKF"). The UKF fuses data sources from multiple measurement devices with a nonlinear numerical model to yield a representative state of the coordinate frame of SLCS and carrier. When performed over time, integrals of subsequent representative states may be used to identify rotational and pendular motion, such as rotation of an SLCS about a suspension cable and an oscillation path of an SLCS, such as oscillation path 237.

Kalman filters produce a predicted future state based a past state and a joint probability distribution of a series of measured values in a timespan; the values often contain statistical noise and other inaccuracies. Past values may be discarded and the predicted state then compared to new measured values to produce a new predicted future state. However, Kalman filters may be limited to linear systems. For nonlinear systems, in which non-linearity occurs in either or both the process model or observation model, a Kalman filter may provide poor performance when covariance is propagated through linearization of the underlying non-linear model(s). To address this, an adaptive model may be used, such as an Unscented Kalman Filters ("UKF"). UKF use a deterministic sampling technique, unscented transformation, to pick a minimal set of sample points, which may be referred to as sigma points, around a mean. The sigma points are then propagated through the non-linear functions, from which a new mean and covariance estimate is formed.

An adaptive system model, such as a UKF, may then recursively estimate varying parameters of the then-current system model, including mass of SLCS and load, cable length, inertia of SLCS and load, movement and rotation SLCS, and movement and rotation of the carrier. Inertial based measurements are sent to disturbance estimator matrices of a filter, from which wind force, sea state, and relative SLCS and helicopter motion may be estimated. These state parameters of the adaptive system model may not be "hardwired" into data fusion and telemetry output module 800, but may be dynamically determined by data fusion and telemetry output module 800. For example, when a load comprises only an empty litter weighing thirty-five pounds, the estimated mass of SLCS and load is much less than when the litter is holding a person who weighs two-hundred pounds. The behavior of an SLCS in activating the fans to deal with the dynamic behavior of the lighter load is very different than the behavior of the SLCS to deal with the heavier load and, generally, involves lighter fan actuation. If it did not, and if the SLCS were not able to dynamically determine the mass of the SLCS and load and the other state parameters, the SCLS would not be able to control the lighter load, but may "overdrive" it and make control of the suspended load less likely. If the SLCS were not able to dynamically determine the mass of the SLCS and load, the other state parameters, and the disturbances, the SLCS would not be able to transition from controlling an unweighted litter to controlling a litter containing a person, as occurs during use of an SLCS. Similarly, the estimated length of the cable and/or of inertia has a large effect on pendular motion and how to control it. Systems addressed to control of autonomous vehicles are not known to include system models as described herein, which include continuous and dynamic determination of parameters such as mass of SLCS and load, cable length, inertia of SLCS and load, movement and rotation SLCS, movement and rotation of the carrier, and disturbance estimations of wind force, sea state, and relative SLCS and helicopter motion.

Other closed-loop control methods including fuzzy-tuned proportional, integral, and derivative feedback controllers with bidirectional communication and control methods including deep learning neural nets.

At opening loop block 801 through closing loop block 830, data fusion and telemetry output module 800 estimates a state of a coordinate system based on measured sensor values, iteratively determines a new estimated future state based on new measured values, and performs an integral of successive state values to identify rotation and pendular motion.

At block 805, data fusion and telemetry output module 800 obtains sensor data, such as image data, accelerometer, gyroscopic, magnetometer, LIDAR, and, if available, GPS data. Image data may comprise object detection, such as detection of a helicopter or other carrier, as well as components of such an object, such as identification of a cabin and tail. Examples of this are discussed in relation to FIG. 3. Image data and object detection may also comprise identification of optical flow of such images or pixels in successive frames. Accelerometer data may comprise 3-degree of freedom ("3 DoF") acceleration data in a sensor coordinate frame. Gyroscope data may comprise 3 DoF angular acceleration data in the sensor coordinate frame. Magnetometer data may comprise 3 Degree of Freedom ("DoF") magnetic field data in the sensor coordinate frame. LIDAR data may comprise point, sweep, rotating, radial, distance, and/or linear data which measures distance and/or angle relative to objects, the ground, and/or water.

At block 810, data fusion and telemetry output module 800 may filter the sensor data, such as to eliminate values which are errors or outside of an allowed range in both time and frequency domains. For example, values not consistent with a sample time range or not consistent with relevant frequencies may be filtered out. For example, suspension cables may be subject to oscillatory and vibratory frequencies; some of such frequencies may be longer than a plausible length of the suspension cable, may be present in sensor data, and may be filtered out.

At block 815, data fusion and telemetry output module 800 may feed the system model and its past estimated or initialization state fed to the data fusion disturbance estimate model, such as into a system model in a UKF, to be fused with then-current sensor data. As noted, the UKF and system model may include, and may therefore determine as an estimated state, one or more of a mass of load and SLCS, a cable length, an inertia of load and SLCS, a fan and actuation force of the SLCS, rotational motion of the SLCS, pendular motion of the SLCS, and movement of a carrier and/or of a load over time through an absolute coordinate space.

At block 820, data fusion and telemetry output module 800 may determine a new then-current estimated state, based on the system model, last estimated state, and the then-current sensor data. Inertial based measurements are sent to disturbance estimator matrices of a filter, from which wind force, sea state, and relative SLCS and helicopter motion may be estimated.

Estimation of state conditions, such as mass of load and SLCS, cable length, inertia of load and SLCS, fan and actuation forces of the SLCS, rotational motion of the SLCS, pendular motion of the SLCS, and movement of a carrier and/or load over time through an absolute coordinate space and disturbance estimations, such as wind force, sea state, and relative SLCS and helicopter motion are not know to be practiced by previous control systems for unmanned vehicles.

At block 825, data fusion and telemetry output module 800 may output the then-current estimated state. This may be output to, for example, a record accessed by block 735 of decision and control module 700 and/or to a record accessed by block 815 to be fed into the next iteration, if any, of the data fusion disturbance estimate model.

At block 828, data fusion and telemetry output module 800 may determine characteristics of state conditions over time, such as rotation or pendular motion of SLCS, movement of a carrier over time through an absolute coordinate space, and the like. Such characteristics may be determined by determining integrals of such state conditions over time.

At closing loop block 830, data fusion and telemetry output module 800 may return to opening loop block 801, unless or until an exit condition occurs.

At end block 899, data fusion and telemetry output module 800 may exit or return to another process.

FIG. 9 schematically illustrates electronic computer, hardware, and network connections among operational components 900 of a suspended load control system, according with one embodiment. Operational components 900 may be understood as implementing SLCS logical components 501.

Embedded computer 905 may be a computer processor or central processing unit (CPU). The processor may be an embedded system including a signal board computer and one or more microcontroller units ("MCUs"). The CPU and MCUs may be contained within a housing in which data link and electrical connections may be made, such as connections 960 through 994. Embedded computer 905 may comprise computer memory, such as SLCS memory 525.

Connection 970, which may be a serial data connection, may connect embedded computer 905 with inertial navigation system 910. Inertial navigation system 910 may comprise the IMS and GPS, discussed herein.

Connection 975, which may be a gigabit ethernet data connection, may connect embedded computer 905 with one or more optical sensors 955, such as visible light, IR, and other cameras, as discussed herein.

Connection 980, which may be a UDP over gigabit ethernet data connection, may connect embedded computer 905 with one or more LIDAR 950 systems, as discussed herein.

Connection 985, which may be a general purpose, input-output connection, may connect embedded computer 905 with one or more DC contactors, peripherals 945, and the like.

Connection 990, which may be a pulse width modulated electrical connection, may connect embedded computer 905 with one or more LED status indicators 940.

Connection 994, which may be WiFi or wired ethernet UDP/TCP data connection, may connect embedded computer 905 with one or more user control devices 935, such as interactive display or remote interface 550.

Connection 996, which may be an HDMI data connection, may connect embedded computer 905 with one or more HDMI output display devices 930.

Connection 960, which may be a USB data and electrical connection, may connect embedded computer 905 with one or more USB devices 925.

Connections 965, which may form a CAN data bus, may connect embedded computer 905 with one or more electronic speed controllers 915 and one or more sensory feedback units 920. ESC 915 may be a thruster controller to allow embedded computer 905 to control the speed, power draw, and thrust of thrusters in the EDF. An ESC may have the following connections: to the power supply, to a thruster, and to the processor, such as embedded computer 905, to a microcontroller, and/or to sensory feedback units 920. ESC pulls power from the power supply and allocates it to the thrusters to control the amount of thrust produced by EDF.

Figures 11A, 11B, 11C:
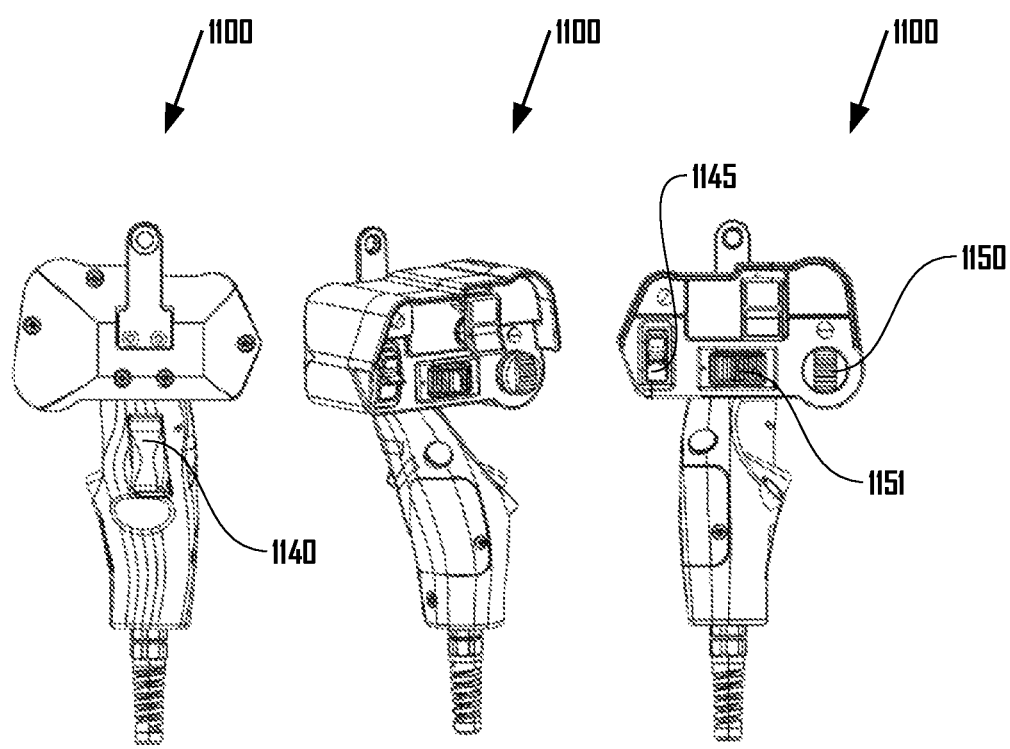
FIG. 11A illustrates back view a remote interface of an SLCS, in accordance with one embodiment.
FIG. 11B illustrates an oblique view of the remote interface of the SLCS of FIG. 11A, in accordance with one embodiment.
FIG. 11C illustrates front view the remote interface of the SLCS of FIG. 11A, in accordance with one embodiment.

FIG. 11A illustrates an embodiment of a remote interface or remote pendant 1100. FIG. 11B illustrates another view of an embodiment of remote pendant 1100, such as an oblique view. FIG. 11C illustrates another view of an embodiment of remote pendant 1100, such as a front view. Remote pendant 1100 may comprise, for example, on/off switch 1145, state selector 1150, and manual/rotational control 1151. On/off switch 1145 may be used to turn on remote pendant 1100. State selector 1150 may be used to select a command state of operational module 600, as may be discussed in relation to FIG. 6. Activation controller 1140 may be used to activate or deactivate an SLCS in or relative to a selected command state. Manual/rotational control 1151 may be used to manually activate fans to rotate or translate a load when, for example, state selector 1150 has been used to select, for example, direct control mode 627. A joystick may be incorporated into remote pendant 1100, such as in replacement of or in addition to manual control 1151.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a helicopter ownship, in other embodiments an SLCS may be employed under a construction crane or gantry. This application is intended to cover any adaptations or variations of the embodiments discussed herein.

Following are non-limiting examples:

Example 1. An apparatus for a load control system to control a load suspended from a carrier, comprising: a computer processor and a memory; a sensor suite to obtain a sensor data regarding a position and orientation of the load control system and/or load; a data fusion module in the memory to determine an estimated state of the load control system and/or load based on the sensor data; a fan array; and a decision and control module in the memory to control the fan array to output at least one of a lateral force or torque on the load control system and/or load based on the estimated state of the load control system and/or load to control the load suspended from the carrier; wherein the load control system, including the sensor suite, are configured to be located proximate to the load at a bottom of a suspension cable spanning between the load and the carrier.

Example 2. The apparatus according to example 1, wherein the load control system and load are subject to an external force, wherein the external force is from at least one of movement of the load by the carrier, an environmental wind, or a wind generated by the carrier and wherein the external force causes or contributes to an undesired movement of the load control system and the load, and wherein to control the load suspended from the carrier is to counteract the undesired movement of the load.

Example 3. The apparatus according to example 1, wherein to determine the estimated state of the load control system and/or load based on the sensor data comprises recursively predicting the estimated state based on a last previously estimated state, the sensor data, a system model, and an estimate of uncertainty of the estimated state.

Example 4. The apparatus according to example 3, wherein recursively predicting the estimated physical state based on a last previously estimated physical state, the sensor data, the system model, and the estimate of uncertainty of the estimated physical state comprises processing the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

Example 5. The apparatus according to example 3, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

Example 6. The apparatus according to example 1, wherein to control the fan array to output at least one of the lateral force or torque on the load control system and/or load based on the estimated state of the load control system and/or load to control the load suspended from the carrier comprises to output frame states for the estimated state of the load control system and/or load, translate the frame states into multi-input multi-output ("MIMO") control laws, determine an actuator matrix for the fan array, and output the MIMO control laws to the fan array according to the actuator matrix.

Example 7. A computer implemented method to control a load suspended from a carrier, comprising: with a computer processor and memory, obtaining a sensor data from a sensor suite regarding a position and orientation of the load; determining an estimated state of the load based on the sensor data; controlling a fan array to output at least one of a lateral force or torque on the load based on the estimated state of the load to control the load suspended from the carrier; wherein the computer processor and memory and the sensor suite are configured to be located proximate to the load at a bottom of a suspension cable spanning between the load and the carrier.

Example 8. The computer implemented method according to example 7, wherein the load is subject to an external force, wherein the external force is from at least one of movement of the load by the carrier, an environmental wind, or a wind generated by the carrier and wherein the external force causes or contributes to an undesired movement of the load, and wherein to control the load suspended from the carrier is to counteract the undesired movement of the load control system and the load.

Example 9. The computer implemented method according to example 7, wherein determining the estimated state of the load control system and/or load based on the sensor data comprises recursively predicting the estimated state based on a last previously estimated state, the sensor data, a system model, and an estimate of uncertainty of the estimated state.

Example 10. The computer implemented method according to example 9, wherein recursively predicting the estimated physical state based on a last previously estimated physical state, the sensor data, the system model, and the estimate of uncertainty of the estimated physical state comprises processing the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

Example 11. The computer implemented method according to example 9, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

Example 12. The computer implemented method according to example 7, wherein controlling the fan array to output at least one of the lateral force or torque on the load based on the estimated state of the load to control the load suspended from the carrier comprises outputting frame states for the estimated state of the load control system and/or load, translating the frame states into multi-input multi-output ("MIMO") control laws, determining an actuator matrix for the fan array, and outputting the MIMO control laws to the fan array according to the actuator matrix.

Example 13. A computer apparatus to control a load suspended from a carrier, comprising: means to obtain a sensor data from a sensor suite regarding a position and orientation of the load; means to determine an estimated state of the load based on the sensor data; means to control a fan array to output at least one of a lateral force or torque on the load based on the estimated state of the load to control the load suspended from the carrier; wherein the means to obtain the sensor data, the means to determine the estimated state of the load, and means to control the fan array are configured to be located proximate to the load at a bottom of a suspension cable spanning between the load and the carrier.

Example 14. The computer apparatus according to example 13, wherein the load is subject to an external force, wherein the external force is from at least one of movement of the load by the carrier, an environmental wind, or a wind generated by the carrier and wherein the external force causes or contributes to an undesired movement of the load, and wherein to control the load suspended from the carrier is to counteract the undesired movement of the load.

Example 15. The computer apparatus according to example 13, wherein the means to determine the estimated state of the load control system and/or load based on the sensor data comprises means to recursively predict the estimated state based on a last previously estimated state, the sensor data, a system model, and an estimate of uncertainty of the estimated state.

Example 16. The computer apparatus according to example 15, wherein means to recursively predict the estimated physical state based on a last previously estimated physical state, the sensor data, the system model, and the estimate of uncertainty of the estimated physical state comprises means to process the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

Example 17. The computer apparatus according to example 15, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

Example 18. The computer apparatus according to example 13, wherein the means to control the fan array to output at least one of the lateral force or torque on the load based on the estimated state of the load to control the load suspended from the carrier comprises means to output frame states for the estimated state of the load control system and/or load, translate the frame states into multi-input multi-output ("MIMO") control laws, determine an actuator matrix for the fan array, and output the MIMO control laws to the fan array according to the actuator matrix.

Example 19. One or more computer-readable media comprising instructions that cause a computer device, in response to execution of the instructions by a processor of the computer device, to: obtain a sensor data from a sensor suite regarding a position and orientation of the load; determine an estimated state of the load based on the sensor data; control a fan array to output at least one of a lateral force or torque on the load based on the estimated state of the load to control the load suspended from the carrier; wherein the computer device is located proximate to the load at a bottom of a suspension cable spanning between the load and the carrier.

Example 20. The computer-readable media comprising instructions according to example 19, wherein the load is subject to an external force, wherein the external force is from at least one of movement of the load by the carrier, an environmental wind, or a wind generated by the carrier and wherein the external force causes or contributes to an undesired movement of the load, and wherein to control the load suspended from the carrier is to counteract the undesired movement of the load.

Example 21. The computer-readable media comprising instructions according to example 19, wherein to determine the estimated state of the load control system and/or load based on the sensor data comprises to recursively predict the estimated state based on a last previously estimated state, the sensor data, a system model, and an estimate of uncertainty of the estimated state.

Example 22. The computer-readable media comprising instructions according to example 21, wherein to recursively predict the estimated physical state based on a last previously estimated physical state, the sensor data, the system model, and the estimate of uncertainty of the estimated physical state comprises to process the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

Example 23. The computer-readable media comprising instructions according to example 21, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

Example 24. The computer-readable media comprising instructions according to example 19, wherein to control the fan array to output at least one of the lateral force or torque on the load based on the estimated state of the load to control the load suspended from the carrier comprises to output frame states for the estimated state of the load control system and/or load, translate the frame states into multi-input multi-output ("MIMO") control laws, determine an actuator matrix for the fan array, and output the MIMO control laws to the fan array according to the actuator matrix.

The invention claimed is:

1. An apparatus for a load control system to control a load suspended from a carrier, comprising: a computer processor and a memory; a sensor suite to obtain a sensor data regarding a position and orientation of the load control system and/or load; a data fusion module in the memory to determine an estimated state of the load control system and/or load based on the sensor data; a fan array; and a decision and control module in the memory to control the fan array to output at least one of a lateral force or torque on the load control system and/or load based on the estimated state of the load control system and/or load to control the load suspended from the carrier; wherein the load control system, including the sensor suite, are configured to be located proximate to the load at a bottom of a suspension cable spanning between the load and the carrier.

2. The apparatus according to claim 1, wherein the load control system and load are subject to an external force, wherein the external force is from at least one of movement of the load by the carrier, an environmental wind, or a wind generated by the carrier and wherein the external force causes or contributes to an undesired movement of the load control system and the load, and wherein to control the load suspended from the carrier is to counteract the undesired movement of the load.

3. The apparatus according to claim 1, wherein to determine the estimated state of the load control system and/or load based on the sensor data comprises recursively predicting the estimated state based on a last previously estimated state, the sensor data, a system model, and an estimate of uncertainty of the estimated state.

4. The apparatus according to claim 3, wherein recursively predicting the estimated physical state based on a last previously estimated physical state, the sensor data, the system model, and the estimate of uncertainty of the estimated physical state comprises processing the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

5. The apparatus according to claim 3, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

6. The apparatus according to claim 3, wherein recursively predicting the estimated physical state based on a last previously estimated physical state, the sensor data, the system model, and the estimate of uncertainty of the estimated physical state comprises predicting at a location and motion in relative and absolute coordinate frames of at least one of the load, the load control system, or the carrier.

7. The apparatus according to claim 1, wherein to control the fan array to output at least one of the lateral force or torque on the load control system and/or load based on the estimated state of the load control system and/or load to control the load suspended from the carrier comprises to output frame states for the estimated state of the load control system and/or load, translate the frame states into multi-input multi-output ("MIMO") control laws, determine an actuator matrix for the fan array, and output the MIMO control laws to the fan array according to the actuator matrix.

8. A computer implemented method to control a load suspended from a carrier, comprising: with a computer processor and memory, obtaining a sensor data from a sensor suite regarding a position and orientation of the load; determining an estimated state of the load based on the sensor data; controlling a fan array to output at least one of a lateral force or torque on the load based on the estimated state of the load to control the load suspended from the carrier; wherein the computer processor and memory and the sensor suite are configured to be located proximate to the load at a bottom of a suspension cable spanning between the load and the carrier.

9. The computer implemented method according to claim 8, wherein the load is subject to an external force, wherein the external force is from at least one of movement of the load by the carrier, an environmental wind, or a wind generated by the carrier and wherein the external force causes or contributes to an undesired movement of the load, and wherein to control the load suspended from the carrier is to counteract the undesired movement of the load control system and the load.

10. The computer implemented method according to claim 8, wherein determining the estimated state of the load control system and/or load based on the sensor data comprises recursively predicting the estimated state based on a last previously estimated state, the sensor data, a system model, and an estimate of uncertainty of the estimated state.

11. The computer implemented method according to claim 10, wherein recursively predicting the estimated physical state based on a last previously estimated physical state, the sensor data, the system model, and the estimate of uncertainty of the estimated physical state comprises processing the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

12. The computer implemented method according to claim 10, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

13. The computer implemented method according to claim 8, wherein controlling the fan array to output at least one of the lateral force or torque on the load based on the estimated state of the load to control the load suspended from the carrier comprises outputting frame states for the estimated state of the load control system and/or load, translating the frame states into multi-input multi-output ("MIMO") control laws, determining an actuator matrix for the fan array, and outputting the MIMO control laws to the fan array according to the actuator matrix.

14. One or more non-transitory computer-readable media comprising instructions that cause a computer device, in response to execution of the instructions by a processor of the computer device, to: obtain a sensor data from a sensor suite regarding a position and orientation of the load; determine an estimated state of the load based on the sensor data; control a fan array to output at least one of a lateral force or torque on the load based on the estimated state of the load to control the load suspended from the carrier; wherein the computer device is located proximate to the load at a bottom of a suspension cable spanning between the load and the carrier.

15. The non-transitory computer-readable media comprising instructions according to claim 14, wherein the load is subject to an external force, wherein the external force is from at least one of movement of the load by the carrier, an environmental wind, or a wind generated by the carrier and wherein the external force causes or contributes to an undesired movement of the load, and wherein to control the load suspended from the carrier is to counteract the undesired movement of the load.

16. The non-transitory computer-readable media comprising instructions according to claim 14, wherein to determine the estimated state of the load control system and/or load based on the sensor data comprises to recursively predict the estimated state based on a last previously estimated state, the sensor data, a system model, and an estimate of uncertainty of the estimated state.

17. The non-transitory computer-readable media comprising instructions according to claim 16, wherein to recursively predict the estimated physical state based on a last previously estimated physical state, the sensor data, the system model, and the estimate of uncertainty of the estimated physical state comprises to process the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

18. The non-transitory computer-readable media comprising instructions according to claim 16, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

19. The non-transitory computer-readable media comprising instructions according to claim 16, wherein to recursively predict the estimated physical state based on a last previously estimated physical state, the sensor data, the system model, and the estimate of uncertainty of the estimated physical state comprises to predict a location and motion in relative and absolute coordinate frames of at least one of the load, the load control system, or the carrier.

20. The non-transitory computer-readable media comprising instructions according to claim 14, wherein to control the fan array to output at least one of the lateral force or torque on the load based on the estimated state of the load to control the load suspended from the carrier comprises to output frame states for the estimated state of the load control system and/or load, translate the frame states into multi-input multi-output ("MIMO") control laws, determine an actuator matrix for the fan array, and output the MIMO control laws to the fan array according to the actuator matrix.

* * * * *